(12) United States Patent
Son et al.

(10) Patent No.: US 10,397,153 B2
(45) Date of Patent: Aug. 27, 2019

(54) ELECTRONIC DEVICE AND METHOD FOR CONTROLLING RECEPTION OF DATA IN ELECTRONIC DEVICE

(71) Applicant: Samsung Electronics Co., Ltd., Suwon-si, Gyeonggi-do (KR)

(72) Inventors: Jae-Sung Son, Suwon-si (KR); Hye-Rim Kim, Suwon-si (KR); Jae-Hyun Park, Seongnam-si (KR); Hey-Young Park, Seoul (KR); Jong-Kyu Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 15/168,471

(22) Filed: May 31, 2016

(65) Prior Publication Data

US 2016/0359782 A1 Dec. 8, 2016

(30) Foreign Application Priority Data

Jun. 4, 2015 (KR) ........................ 10-2015-0079302

(51) Int. Cl.
*H04L 12/58* (2006.01)
(52) U.S. Cl.
CPC .............. *H04L 51/12* (2013.01); *H04L 51/24* (2013.01)

(58) Field of Classification Search
CPC ....... H04L 65/00–65/80; H04L 47/00–47/829; H04L 51/00–51/38
See application file for complete search history.

(56) References Cited

U.S. PATENT DOCUMENTS

| 2012/0258691 | A1* | 10/2012 | Baer | H04M 1/72563 455/412.2 |
| 2014/0289384 | A1* | 9/2014 | Kao | H04L 51/12 709/223 |
| 2015/0143281 | A1* | 5/2015 | Mehta | G06Q 10/10 715/781 |
| 2015/0185947 | A1* | 7/2015 | Tsai | G06F 3/0488 345/173 |

FOREIGN PATENT DOCUMENTS

| KR | 10-2006-0062201 A | 6/2006 |
| KR | 10-2007-0059580 A | 6/2007 |

* cited by examiner

*Primary Examiner* — Clayton R Williams
(74) *Attorney, Agent, or Firm* — Jefferson IP Law, LLP

(57) ABSTRACT

A method for operating an electronic device is provided. The method includes receiving information from outside of the electronic device, identifying blocking configuration information on the received information, determining a method for blocking the received information according to the blocking configuration information, and blocking the received information based on the determined blocking method.

17 Claims, 17 Drawing Sheets

ELECTRONIC DEVICE AND METHOD FOR CONTROLLING RECEPTION OF DATA IN ELECTRONIC DEVICE

CROSS-REFERENCE TO RELATED APPLICATION(S)

This application claims the benefit under 35 U.S.C. § 119(a) of a Korean patent application filed on Jun. 4, 2015 in the Korean Intellectual Property Office and assigned Serial number 10-2015-0079302, the entire disclosure of which is hereby incorporated by reference.

TECHNICAL FIELD

The present disclosure relates to electronic devices and methods for controlling reception of data in the electronic devices.

BACKGROUND

Recent electronic devices are being developed to come with various functionalities related to applications. For example, an electronic device (e.g., a smartphone) may receive a notification message related to an application. Such electronic devices are under development to be capable of using various functions. Such an electronic device has a display for effective use of the functions. For example, a smartphone has a display (e.g., a touchscreen) responsive to a touch on its front part. Such electronic device may allow various applications ("Apps") installed and run thereon. A diversity of input means, e.g., touchscreen, buttons, mouse, keyboard, or sensors, may be used to run and control the applications on the electronic device.

As the type of applications is diversified, various types of notification messages received in association with the applications come in availability. A user may control the settings of each application to not receive a notification message for the application. The user needs to identify the settings for receiving message in the settings of each application and control the reception of messages in order to control the reception of notification messages, and this may be bothering.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for controlling reception of a message in the electronic device for identifying a user input for at least one notification message displayed on the screen and control the reception of messages of the application based on the identified user input.

In accordance with an aspect of the present disclosure, a method for operating an electronic device is provided. The method includes when receiving information from outside of the electronic device, identifying blocking configuration information on the received information, determining a method for blocking the received information according to the blocking configuration information, and blocking the received information based on the determined blocking method.

In accordance with another aspect of the present disclosure, an electronic device is provided. The electronic device includes a memory for storing one or more pieces of blocking configuration information and a processor configured to receive information from outside of the electronic device, display the information through a display, determine blocking configuration information on the information, at least, based on a user input obtained for at least a portion of the information, and store the blocking configuration information, as the one or more pieces of blocking configuration information, in the memory.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
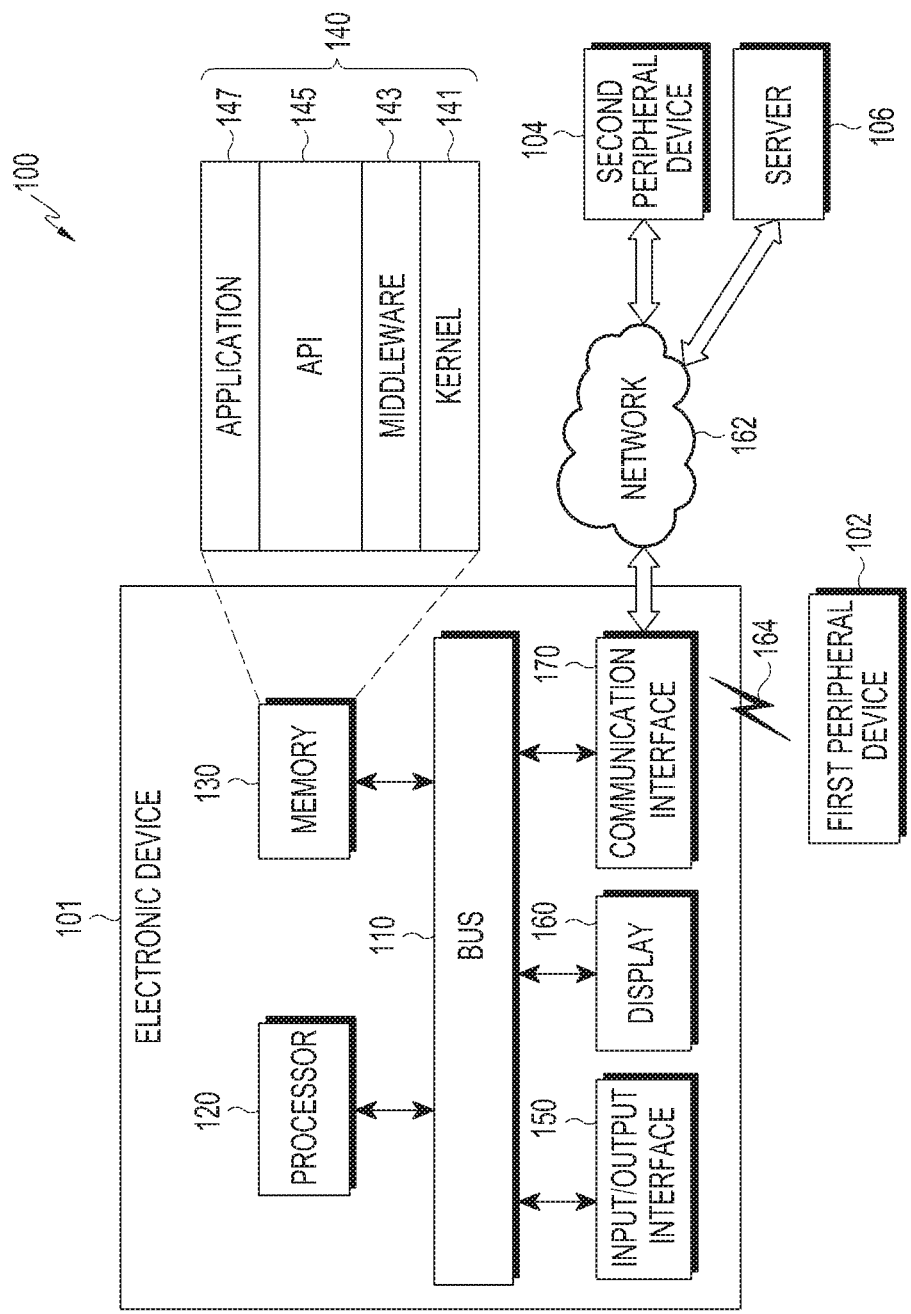
FIG. 1 is a view illustrating an example network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (1) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer-III (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. For example, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a television (TV) box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the present disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

According to an embodiment of the present disclosure, the notification message received by the electronic device may include a push message transmitted from an external server or application. For example, the notification message may include sender information (e.g., application or server information) or various information (e.g., disaster information, weather information, emergency information, advertisement information, or stock information).

According to an embodiment of the present disclosure, the notification panel screen may include areas for displaying various information related to the electronic device, such as buttons for controlling at least one function of the electronic device or a notification window. For example, the notification message may be transmitted from at least one application, external server, or other various electronic devices and may be displayed through the notification window.

According to an embodiment of the present disclosure, the states of the notification message may include various states related to the received notification message, such as the state of having been transmitted and received from application, the state of having been displayed on the notification panel screen, the state of outputting, e.g., a sound to alert the reception of notification message, a neglect state of having no user input for a preset time or having a preset number of times of reception or more but having no user input, the state of having been deleted from the notification panel screen, or the state of having the notification message displayed as per user input.

According to an embodiment of the present disclosure, the type of user input may include any type of operation of the user that may be identified while the user touches, e.g., the display, sensor, touch pad, or touchscreen and then releases the touch. For example, the type of user input may include contact time, contact pressure, contact area, and touch and move. Any other types of user inputs including at least one user gesture may also be possible.

According to an embodiment of the present disclosure, the type of gesture may include a touch (e.g., press or enter) which is a gesture of placing a finger on the display, a tap which is a gesture of lightly and shortly hitting a finger on the display, a double tap which is a gesture of quickly hitting a finger twice on the display, a triple tap which is a gesture of quickly hitting a finger three times on the display, a flick which is a gesture of taking the finger off the display before the finger stops moving too quickly scroll or rotate the display, a drag which is a gesture of moving or scrolling a display element, a drag and drop which is a gesture of moving an object with the object touched and taking the finger off when the object is on stop, a swipe which is a gesture of moving a finger horizontally or vertically to a predetermined distance while the finger touches the display, a multi-swipe which is a gesture of moving two or three fingers horizontally or vertically to a predetermined distance while the fingers touch the display, a pinch which is a gesture of moving two fingers in opposite directions while the fingers touch the display, a touch and hold which is a gesture of leaving a finger on the screen until a display element shows up, a shake which is a gesture of shaking the electronic device to work, and a rotate which is a gesture of switching the orientation of display from vertical to horizontal or vice versa. For example, the tap gesture may include a long tap gesture by which the touch lasts longer than a preset time. The pinch gesture may include a pinch-in gesture by which the two fingers come close or a pinch-out gesture by which the fingers come apart.

According to an embodiment of the present disclosure, the application (e.g., an application program) may include one or more applications that may perform functions such as home, dialer, messaging (short message service (SMS), multimedia messaging service (MMS), or instant message (IM)), browser, camera, alarm, contacts, voice dial, email, calendar, media player, album or clock, health-care (e.g., measuring the amount of exercise, motion, blood pressure, weight, body fat, or blood sugar), measure geographical information global positioning system (GPS), planner, take note (e.g., note or memo), or provide environment information (e.g., air pressure, humidity, or temperature information).

According to an embodiment of the present disclosure, although it is described below that a particular user input needs to be entered to control the reception or display of notification messages, this is for the purpose of description of an example in which the reception or display of notification message may be controlled by the user input, and the type of user input may be set to at least one of various types of inputs by the setting of the user or manufacturer or functions provided from the electronic device.

Hereinafter, electronic devices and methods for controlling reception of messages in the electronic devices are described with reference to the accompanying drawings. As used herein, the term "user" may denote a human or another device (e.g., an artificial intelligent electronic device) using the electronic device.

FIG. 1 is a view illustrating an example network environment according to an embodiment of the present disclosure.

Referring to FIG. 1, the electronic device 101 is included in a network environment 100, and the electronic device 101 may include a bus 110, a processor 120, a memory 130, an input/output interface 150, a display 160, and a communication interface 170.

According to an embodiment of the present disclosure, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a CPU, an AP, or a communication processor (CP). The processor 120 may perform control on at least one of the other components of the electronic device 101, and/or perform an operation or data processing relating to communication.

For example, according to an embodiment of the present disclosure, the processor 120 may display a plurality of notification messages received from a plurality of applications through the display 160 (e.g., notification panel screen) or a display operatively connected with the electronic device, identify a user input entered corresponding to at least one of the notification messages, and control the reception of at least one notification message for which the user input has been entered.

According to an embodiment of the present disclosure, the processor 120 may permit the reception of message received from the application (e.g., application server) based on the authorization of the user and request for authorization of the application when the application is installed. For example, the processor 120 may display the message transmitted from the application server through the display or may notify the user of the reception of message through vibration or sound.

For example, the processor 120 may transmit information on the notification message having the user input entered to the server (e.g., the server 106). For example, the information on the notification message having the user input entered may include application information, keyword information, number of times of entry of user input, or type of user input entered (e.g., receive, neglect or block by gesture).

According to an embodiment of the present disclosure, when a user input for controlling the reception of notification message is entered for a first notification message displayed on the notification panel screen, the processor 120 may perform control to not receive notification message from the first application having transmitted the first notification message.

For example, when a user input (e.g., double tap) is entered on the second notification message displayed on the notification panel screen, the processor 120 may identify the type of message corresponding to the second notification message and may control the reception of messages corresponding to the type of message among the notification messages transmitted from the second application having transmitted the second notification message.

For example, the processor 120 may display a third notification message received through the notification panel screen and a delete button, and when a user input (e.g., drag and drop gesture) is entered from the displayed third notification message to the delete button on the notification panel screen, the processor 120 may control the reception of notification message of the third application having transmitted the third notification message.

For example, when a user input is entered on a fourth notification message displayed on the notification panel screen for controlling the reception, the processor 120 may identify the information on the fourth application having transmitted the fourth notification message and may control the reception of notification messages from the fourth application.

For example, the processor 120 may determine whether to receive notification messages from the fourth application based on the weight of the fourth application calculated according to the importance of information included in the fourth notification message.

For example, when a user input is entered for controlling the display, the processor 120 may perform control to not display notification message received from the fifth application having transmitted the fifth notification message or control whether to display on the notification panel screen at least one of notification messages (e.g., image, text, or link) transmitted from the fifth application based on at least one keyword extracted from the fifth notification message.

According to an embodiment of the present disclosure, the memory 130 may include a volatile and/or non-volatile memory. For example, the memory 130 may store commands or data related to at least one other component of the electronic device 101.

According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

According to an embodiment of the present disclosure, the memory 130 may display through the display 160 the notification panel screen displaying a plurality of notification messages received from a plurality of applications by the processor 120 and may store instructions for controlling the reception for at least one notification message having the user input entered, corresponding to the user input entered corresponding to at least one of the notification messages displayed on the notification panel screen.

For example, when a user input for controlling the reception of notification message is entered for a first notification message displayed on the notification panel screen, the instructions may control the processor 120 to not receive notification message from the first application having transmitted the first notification message. For example, the instructions may control the processor 120 to temporarily receive messages set to not be received. According to an embodiment of the present disclosure, the instructions may control the processor 120 to not receive messages set to be received for a preset time.

For example, when a double tap is entered on the second notification message displayed on the notification panel screen, the instructions may control the processor 120 to identify the type of message corresponding to the second notification message and may control the reception of messages corresponding to the type of message among the notification messages transmitted from the second application having transmitted the second notification message.

For example, the instructions may control the processor 120 to display a third notification message received through the notification panel screen and a delete button, and when a drag and drop gesture is entered from the displayed third notification message to the delete button on the notification panel screen, the processor 120 may control the reception of notification message of the third application having transmitted the third notification message.

For example, when a user input is entered on a fourth notification message displayed on the notification panel screen for controlling the reception, the instructions may control the processor 120 to identify the information on the fourth application having transmitted the fourth notification message and may control the reception of notification messages from the fourth application.

For example, the instructions may control the processor 120 to calculate the weight of the fourth application according to the importance of information included in the fourth notification message and determine whether to receive notification messages from the fourth application based on the calculated weight.

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign at least one of application programs 147 with priority of using system resources of the electronic device 101. For example, the middleware 143 may perform scheduling or load balancing on the one or more task requests by processing the one or more task requests according to the priority assigned to the at least one application program 147.

The API 145 may include an interface allowing the application program 147 to control functions provided from the kernel 141 or the middleware 143. For example, the API 145 may include at least one interface or function (e.g., command) for file control, window control, image processing, or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, an electronic paper display, or a display touchscreen. The display 160 may display, e.g., various contents (e.g., text, images, videos, icons, or symbols) to the user.

According to an embodiment of the present disclosure, the display 160 may display a notification panel. For example, the notification panel may include at least one button for setting various functions of the electronic device 101 or a symbol indicating that a notification message is received. For example, the notification panel may include the respective icons and names of the applications having sent the notification messages and the contents of the notification messages in the order where the notification messages are received.

According to an embodiment of the present disclosure, the display 160 may receive a touch, gesture, proximity, or hovering input using an electronic pen or portion of the user's body through the touchscreen.

The communication interface 170 may configure communication between the electronic device 101 and an external device (e.g., the first peripheral device 102 or second peripheral device 104 or sever 106). For example, the communication interface 170 may be connected with the network 162 through wireless or wired communication to communicate with the external device (e.g., the first peripheral device 102, second peripheral device 104, or server 106).

For example, the wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM).

For example, the wireless communication may include, e.g., short-range communication 164. The short-range communication 164 may include at least one of wireless fidelity (Wi-Fi), Bluetooth (BT), near-field communication (NFC), or GNSS. The GNSS may include at least one of, e.g., GPS, global navigation satellite system (GLONASS), Beidou navigation satellite system (hereinafter, "Beidou") or Galileo, or the European global satellite-based navigation system.

For example, the wired connection may include at least one of, e.g., universal serial bus (USB), high definition multimedia interface (HDMI), recommended standard (RS)-232, or plain old telephone service (POTS).

The network 162 may include at least one of telecommunication networks, e.g., a computer network (e.g., local area network (LAN) or wide area network (WAN)), Internet, or a telephone network.

The first peripheral device 102 and the second peripheral device 104 each may be a device of the same or a different type from the electronic device 101.

The server 106 may include a group of one or more servers. For example, the server 106 may include the server of the application 147, an advertisement server, or other various servers providing services.

According to an embodiment of the present disclosure, the server of the application may transmit a notification message including various information related to the application 147 to the electronic device 101.

According to an embodiment of the present disclosure, the advertisement server may receive information on the notification message where a user input has been inputted from the electronic device 101 and may provide an advertisement to the electronic device 101 based on the received information. For example, the advertisement server may identify the received information to identify the number of times of entry of the user input, type of the entered user input, or keyword commonly included in the application information or the notification messages having the user input entered to thereby grasp the user's preference, interest, or propensity.

According to an embodiment of the present disclosure, the advertisement server may provide an advertisement based on the user information grasped based on the information on the notification message having the user input entered so that the user may receive advertisement information suitable for the user.

According to an embodiment of the present disclosure, at least one of operations running on the electronic device 101 may be executed on the external device (e.g., the first peripheral device 102, second peripheral device 104, or server 106).

According to an embodiment of the present disclosure, when the electronic device 101 should perform a function or service automatically or at a request, the electronic device 101, instead of executing the function or service on its own or additionally, may request another external device (e.g., the first peripheral device 102, second peripheral device 104 or server 106) to perform at least some functions associated therewith. The other external device (e.g., the first peripheral device 102, second peripheral device 104, or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
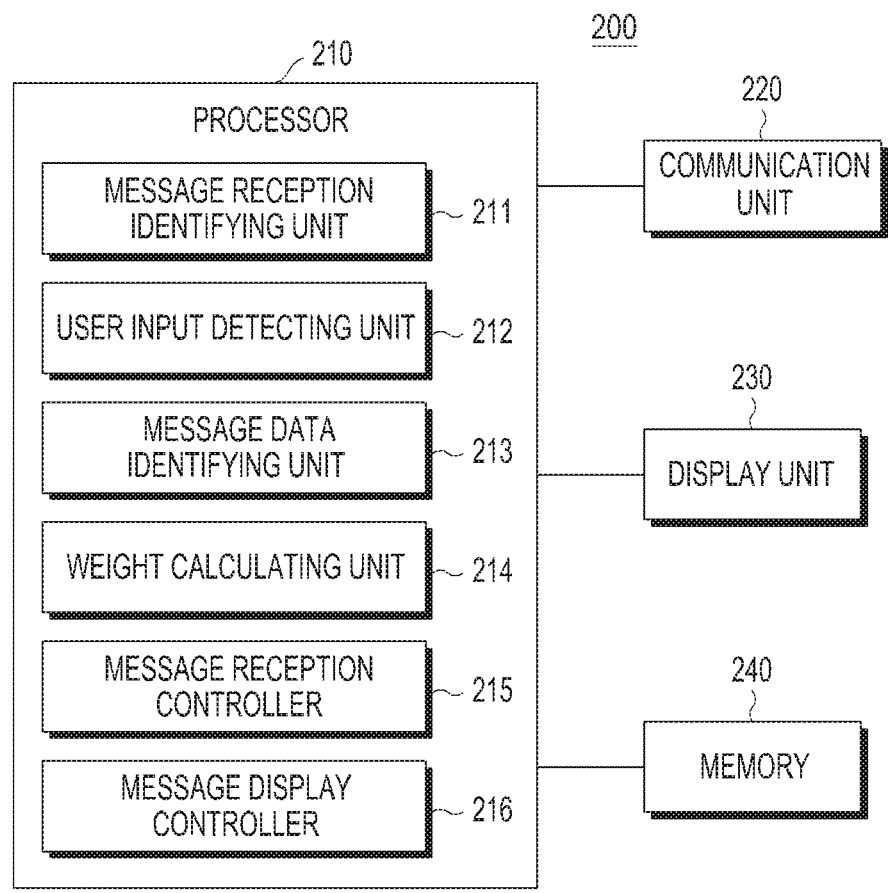
FIG. 2 is a block diagram illustrating an example configuration of an electronic device according to an embodiment of the present disclosure.

FIG. 2 is a block diagram illustrating an example configuration of an electronic device according to an embodiment of the present disclosure.

Referring to FIG. 2, the electronic device 200 may include a processor 210, a communication unit 220, a display unit 230, or a memory 240.

The processor 210 may include a message reception identifying unit 211, a user input detecting unit 212, a message data identifying unit 213, a weight calculating unit 214, a message reception controller 215, or a message display controller 216.

The message reception identifying unit 211 may identify the reception of a notification message related to at least one application of the electronic device. For example, the notification message may be generated and transmitted from the at least one application or may be received through the communication network from the server providing information related to at least a portion of functions of the at least one application.

According to an embodiment of the present disclosure, the received notification message may be displayed through the display unit 220 (e.g., the notification panel screen) of the electronic device 200. For example, the notification message displayed on the notification panel screen may include information on the application or message data. The application information may include an icon or name information for identifying the application, and the message data may be the content of the notification message that may include various types of data including, e.g., text, image, or link (e.g., hyper link).

The user input detecting unit 212 may detect a user input entered for the received notification message and may determine whether the detected user input is an input for controlling the display or reception of the notification message. For example, the user input may include a gesture input in the form of a tap, double-tap, triple-tap, drag-and-drop, long tap, or slide, or other various types of inputs that may be inputted from the user.

According to an embodiment of the present disclosure, the user input detecting unit 212 may identify notification messages for which a predetermined number of user inputs or more have not been made among the received notification messages.

The message data identifying unit 213, upon reception of a user input for at least one notification message, may identify data included in the notification message having the user input entered. For example, the message data identifying unit 213 may identify application information or content of message (e.g., image, text, or link) included in the notification message.

According to an embodiment of the present disclosure, the message data identifying unit 213 may identify a keyword commonly included in at least one notification message having the same user input entered. For example, the keyword may include the type or name of the application related to the at least one notification message or text data (e.g., a word) commonly included in the content of the at least one notification message.

According to an embodiment of the present disclosure, the message data identifying unit 213 may identify the user's health-care information for a predetermined time through at least one notification message associated with a health-care application. For example, the message data identifying unit 213 may identify a variation in the user's health-care information (e.g., amount of exercise, body weight, heart rate, or body fat).

The weight calculating unit 214 may calculate a weight for the identified keyword or application corresponding to the notification message based on the result of identifying the data of the notification message. For example, the weight calculating unit 214 may calculate the weight based on the type of application, such as game, stock, weather, bank, message, advertisement, shopping, cafe, or healthcare, or the importance of a particular keyword per application or association with the user's activity (e.g., conference, exercise, shopping or other user activities based on the information obtained through a sensor of the electronic device (e.g., the electronic device 101) or peripheral device (e.g., the peripheral devices 102 and 104)), status of notification message, whether particular is included (e.g., disaster information, weather information, emergency information, advertisement information, social issue-related information, or stock information) or association with an external device.

According to an embodiment of the present disclosure, the user's activities (e.g., a prior activity) may include a user activity based on information (e.g., sensor information, location information, data, or message) obtained through the electronic device (e.g., the electronic device 101) or a peripheral device (e.g., the peripheral devices 102 and 104), the location of the user, a function being run by the user through the electronic device (e.g., the electronic device 101) or peripheral device (e.g., the peripheral devices 102 and 104), or input entered by the user through the electronic device. According to an embodiment of the present disclosure, the location of the user may include the location or position of the user or the electronic device based on GNSS (e.g., GPS) information obtained through the GNSS (e.g., GPS) receiver of the electronic device or peripheral device (e.g., a wearable device).

According to an embodiment of the present disclosure, the user's activity based on the information obtained through the sensor of the electronic device or peripheral device may include various user activities. For example, the user activities may include a static state, an active state, or an activity, e.g., strenuous exercise, determined by the electronic device based on the information obtained from a motion sensor of the electronic device.

According to an embodiment of the present disclosure, the function being run on the electronic device may include a function of, e.g., an application run based on an input obtained from the user by the electronic device or a signal received by the electronic device through an external device (e.g., the server 106, network 162, or peripheral device). For example, the electronic device may receive a call from the external device. According to an embodiment of the present disclosure, the electronic device may run a particular application (e.g., scheduler, game, music play) based on a user input.

According to an embodiment of the present disclosure, the prior activity of the user may include the user's past activity (e.g., neglect or delete message) for the message related to the information received through the electronic device. For example, the electronic device (e.g., the weight calculating unit 214), when the electronic device received a message associated with the information and the user neglected or identified the message in the past, may vary the weight of the information. According to an embodiment of the present disclosure, the electronic device (e.g., the processor 210) may make settings to block the message associated with the information based on the varied weight.

According to an embodiment of the present disclosure, the user's prior activity may mean, e.g., a user activity made prior to the time when information is received from the outside through the electronic device.

According to an embodiment of the present disclosure, the prior activity may include a prior activity of the user of the electronic device or a prior activity of a user of at least one other electronic device (e.g., the first peripheral device 102 or second peripheral device 104). For example, the server (e.g., the server 106) may store information associated with the user's prior activity corresponding to the at least one other electronic device. For example, the server may store information as to how the user corresponding to the at least one other electronic device reacted to the information (e.g., message) received from the outside (e.g., when, where, and what information of what application the user received, blocked, or temporarily blocked).

According to an embodiment of the present disclosure, the electronic device (e.g., the electronic device 101) may determine whether to block received information or a method for blocking the information based on whether the information associated with the user's prior activity corresponding to the at least one other electronic device (e.g., the first peripheral device 102 or second peripheral device 104) received from the server (e.g., the server 106) or external device meets a predetermined condition.

According to an embodiment of the present disclosure, the electronic device may block the received information based on whether the user's activity (e.g., the prior activity) meets a predetermined condition. For example, when the history that the user of the external device reacted to information received through a particular application in the past (e.g., before the time when the electronic device received the information) to block the information by a predetermined number of times or more in a particular location or at a particular time is stored in the server, the electronic device may determine that the information received through the particular application in the particular location or at the particular time is unnecessary information based on the information associated with the prior activity stored in the server and may block the information.

According to an embodiment of the present disclosure, the electronic device may determine to release the blocking of the received information based on whether the user's activity (e.g., the prior activity) meets a predetermined condition. For example, when the history that the user of the external device reacted to information received through a particular application in the past to release the blocking of the information by a predetermined number of times or more in a particular location or at a particular time is stored in the server, the electronic device may at least temporarily release the blocking of the information received through the particular application in the particular location or at the particular time is unnecessary information based on the information associated with the prior activity stored in the server.

According to an embodiment of the present disclosure, the predetermined number of times may be set differently depending on the type of application or electronic device or the content included in the information.

According to an embodiment of the present disclosure, the weight calculating unit 214 may determine, e.g., the user's location or electronic payment information to determine user activity (e.g., in meeting, purchase product, or inside/outside cafe) information and may calculate the weight based on the result of determining the association between the received notification message and the user activity (e.g., prior activity). For example, when the user is in a meeting, the weight calculating unit 214 can put a higher weight on the meeting-related notification message received during the meeting than earlier. For example, meeting-related notification messages, although set to not be received as the user input is entered (e.g., set reception reject), may be displayed through the display unit 230 based on the calculated weight if received during the meeting.

According to an embodiment of the present disclosure, although notification messages from a particular cafe application are set to not be received or displayed, the weight calculating unit 214 may put a higher weight on the notification messages of the cafe application according to the location of the user. For example, the notification messages of the cafe application, when set to not be received or displayed by entry of a user input, may be stored in the memory 240. Thereafter, when the user is positioned inside the cafe, the stored notification messages may be displayed, or when the user goes out of the cafe, the stored notification messages may be controlled to not be displayed.

According to an embodiment of the present disclosure, the weight calculating unit 214 may identify an external device (e.g., a wearable device, TV, or sound device (e.g., an earphone or speaker)) connected with the electronic device 200 to calculate the weight of the notification message related to the external device. For example, the weight calculating unit 214 may calculate the weight so that the notification message related to the external device is transmitted only to one of the electronic device 200 or the external device based on whether the application is run on the electronic device 200 through the connected external device, connection information with the external device, or the location of the external device. For example, the weight calculating unit 214, upon determining that the external device is positioned closer to the user than the electronic device 200 is, may calculate the weight for the notification message so that the notification message is transmitted to the external device but not received by the electronic device 200.

According to an embodiment of the present disclosure, the weight calculating unit 214, upon determining that the user's health-care information identified through the message data identifying unit 213 exhibits a drastic condition variation (e.g., erroneous signal indicating abnormal heath condition or a variation departing from the range set in the previous health condition) as compared with information measured previously, may determine that the importance for notification message received from the health-care application is high and put a higher weight on the health-care application than earlier.

According to an embodiment of the present disclosure, the weight calculating unit 214 may add weight if the state of notification message is delete state, add weight according to neglected time or number of times of reception when the state is neglect state, and deduct the weight when the state is executed state. For example, the processor 210 may perform control to not receive notification message including a particular keyword or notification message of application transmitting notification message and having higher weight set thereto, based on the calculated weight.

According to an embodiment of the present disclosure, the processor 210 may control the reception or display of a particular notification message based on the calculated weight. For example, when the weight calculated for the notification message is a value in a preset range, the processor 210 may perform control so that the notification message is displayed for a preset time (e.g., five hours or one week) and is then deleted, or the processor 210 may perform control to reject reception only for a particular time or abstain from receiving messages to the notification message as many as a preset number (e.g., 50) or make other various settings as to reception or display of the particular message in various scenarios.

According to an embodiment of the present disclosure, the weight calculating unit 214 may receive (e.g., through the communication interface 170) the weight policy per type of application from the server (e.g., server 106). For example, the weight calculating unit 214 may receive the policy of filtering a particular keyword for the application providing a social networking service (SNS) to block notification messages and the policy of blocking notification message according to the number of times (e.g., five times or more) at which notification message state (e.g., neglect) is detected for a shopping application and may apply the same to calculating the weight.

According to an embodiment of the present disclosure, the processor 210 may control the reception or display of notification message based on whether information in the application in the electronic device (e.g., electronic device 200) meets a predetermined condition. For example, whether to receive or display notification message having the user input entered may be controlled depending on whether the keyword (e.g., name, phone number or trademark) included in the data of notification message having the user input entered is included in the reception reject list in other application (e.g., SMS, email, or phone).

According to an embodiment of the present disclosure, the weight calculating unit 214 may put a higher weight to the notification message including the keyword included in the reception reject list or the application having transmitted the notification message. For example, the keyword included in the reception reject list may be updated, and the weight calculating unit 214 may periodically check the reception reject list to add weight to the notification message including the updated keyword or application having transmitted the notification message.

According to an embodiment of the present disclosure, the blocking operation may include the operation in which the electronic device performs control (e.g., a request) so that message is not sent from the external device (e.g., server 106, first peripheral device 102 or second peripheral device 104) to the electronic device. According to an embodiment of the present disclosure, the blocking may include an operation in which, when the message received from the external device is a message blocked by the user, the electronic device does not let this known to the user.

According to an embodiment of the present disclosure, the blocking operation may include temporary blocking. For example, the temporary blocking operation means that the electronic device (e.g., the electronic device 101) temporarily stops displaying the message received from an outside (e.g., the first peripheral device 102, second peripheral device 104, or server 106) or blocks the reception of the message based on whether to meet a predetermined condition. For example, the electronic device (e.g., the message reception controller 215) may stops the display or blocks the reception of the received message or message associated with the received message for a particular time (e.g., about one day, one week, or until the user's activity is terminated) based on the result of calculation by the weight calculating unit 214 based on at least one of the user input, activity, or weight for the received message.

According to an embodiment of the present disclosure, the temporary blocking operation may include abstaining from displaying the received message by the electronic device through the display (e.g., the display 160) or abstaining from transmitting the received message to another electronic device (e.g., the first peripheral device 102 or second peripheral device 104) operatively connected with the electronic device.

According to an embodiment of the present disclosure, the electronic device may temporarily receive the temporarily blocked message based on whether to meet a predetermined condition. For example, the electronic device (e.g., the message reception controller 215) may display the received message or message associated with the received message through the display operatively connected with the electronic device (e.g., the display 160, the display of the first peripheral device 102, or the display of the second peripheral device 104) based on the result of calculation of the weight calculating unit 214 for the message received for the temporarily blocked period.

According to an embodiment of the present disclosure, the electronic device may temporarily receive the blocked message based on whether to meet a predetermined condition. For example, the electronic device (e.g., the message reception controller 215) may display the received message or message associated with the received message through the display operatively connected with the electronic device (e.g., the display 160, the display of the first peripheral device 102, or the display of the second peripheral device 104) for a particular period of time (e.g., about one day, one week, or until the user's activity is terminated) based on the result of calculation of the weight calculating unit 214 for the message received for the temporarily blocked period. According to an embodiment of the present disclosure, the electronic device may display only at least a portion of the message temporarily received through the display operatively connected with the electronic device. For example, the electronic device may receive the message set to be blocked based on the user input, and when determining that the user's current or prior activity has a high association with the content of the message, may extract the content related to the activity and display the same through the display.

According to an embodiment of the present disclosure, the server (e.g., the server 106) may vary at least a portion of the weight policy based on information on the application related to the received information or blocking-related information obtained in relation to the received information. For example, the server may store the weight policy per type of application, collect information on whether to block each application for at least one user, and vary at least a portion of the policy. For example, the policy may include settings related to the time for displaying the blocked notification message or settings for blocking temporarily the notification message based on the importance of data (e.g., keyword or content) of the notification message, and the processor 210 may display the blocked or received notification message based on the time supposed to be displayed or whether to display the particular notification message based on the varied policy.

Upon reception of a user input (e.g., double tap, triple tap, or tap and drop or other gestures) for controlling the reception of notification message transmitted from the first application, the message reception controller 215 may perform control to not receive notification messages transmitted afterward from the first application. For example, the notification message transmitted from the first application may include various data related to the first application.

According to an embodiment of the present disclosure, the message reception controller 215 may identify the weight calculated for the first application and may control the reception of notification message transmitted from the first application. For example, although a user input for controlling reception is entered, such control may be performed that the notification message for the first application is received. In this case, the first application may be an application transmitting notification message including information of higher importance, such as emergency or security and may be an application for which no weight has been calculated for controlling reception.

According to an embodiment of the present disclosure, for the notification message having the user input entered for controlling reception, the message reception controller 215 may identify the communication channel (e.g., push channel) through which the notification message is transmitted and may block the identified communication channel to stop receiving notification messages from a particular application.

According to an embodiment of the present disclosure, the message reception controller 215 may identify the blocking configuration information on the received message. For example, the message reception controller 215 may identify whether blocking is set on the received message based on the content of the received message or user input.

According to an embodiment of the present disclosure, the message reception controller 215 may determine a method for blocking the received message. For example, among a plurality of blocking methods, the message reception controller 215 may select a blocking method based on the blocking configuration information on the message. According to an embodiment of the present disclosure, the message reception controller 215 may block the received information based on the blocking method.

According to an embodiment of the present disclosure, the processor 210 may perform control to display a confirm message inquiring about whether to receive notification message of the application through the display 230 when identifying that a preset user input is entered for the notification message of the particular application. For example, as the user responds to the message, the message reception controller 215 may perform control to not receive the notification message transmitted from the application.

Upon entry of a user input (e.g., a slide) for controlling the display for notification message transmitted from the second application, the message display controller 216 may delete the display of the notification message displayed on the notification panel screen, or although the notification message is received later from the second application, may perform control so that the notification message is not displayed on the notification panel screen.

According to an embodiment of the present disclosure, when user input is entered by a preset number of times or more for the notification messages transmitted from the third application, and the keyword commonly included in the notification messages, the message display controller 216 may perform control to not display the notification messages including the extracted keyword among the notification messages transmitted from the third application.

According to an embodiment of the present disclosure, as the reception or display for a particular notification message is controlled on the notification panel screen according to the user input entered, the user may identify only his desired notification messages through the notification panel screen.

According to an embodiment of the present disclosure, the message display controller 216 may identify the weight calculated for the notification messages having the user input entered for controlling the display and control the display of the notification message according to the calculated weight. For example, the weight for each application may be calculated as per importance of data included in the application or notification message.

According to an embodiment of the present disclosure, the message display controller 216, although user input for control is entered by a preset number of times or more for the notification message of a particular application, may perform control so that notification messages from the application continue to be displayed as the application is set to have higher importance, such as security or emergency.

According to an embodiment of the present disclosure, the message display controller 216 may identify the keyword set by the user and may control whether to display the notification message including the keyword. For example, when the user has entered for keywords of low importance, such as advertisement or loan, the message display controller 216, although receiving notification message including the keyword through at least one application, may perform control to not display the notification message.

According to an embodiment of the present disclosure, the message display controller 216 may separately store notification messages, which are received but not displayed, in the memory 240, and the user may identify the notification messages stored in the memory 240 to check if there are messages missed by the user among the messages arbitrarily rendered to not be displayed by the processor 210.

According to an embodiment of the present disclosure, the processor 210 may identify the rate of reception by an external electronic device for notification messages of a particular application and may control whether to display later the notification message having user input entered. For example, the rate of reception may be calculated through the server of each application based on a predefined protocol or information indicating whether to receive the notification message of the application by the external electronic device. The processor 210 may perform control to display notification messages calculated to have a higher reception rate than a preset value after a predetermined period even when a user input for controlling reception or display is entered.

According to an embodiment of the present disclosure, the processor 210 may receive information (e.g., reception rate or weight information) related to the reception of notification message from the outside and may control the settings as to the reception or display of each of various notification messages based on the received information.

The communication unit 220 may communicate data with the exterior. For example, the communication unit 220 may receive notification messages (e.g., alert messages) through a communication channel (e.g., push channel).

According to an embodiment of the present disclosure, the notification message may be received through the communication unit 220 from the server of the application of the electronic device 200 or may be generated from a particular application and received by the electronic device 200.

According to an embodiment of the present disclosure, the communication unit 220, when receiving a request to block notification message transmitted from a particular application by the message reception controller 215, may send a signal for blocking the channel connected with the application or send a request for blocking.

The display 230 may display a notification panel screen. For example, the processor 210, when detecting a preset user input (e.g., a slide gesture from a particular point downwards, may perform control to display the notification panel screen through the display unit 230.

The memory 240 may store instructions to control the processor 210 to display notification message transmitted from at least one application on the notification panel screen, detect a user input for the displayed notification message, and control reception of notification message of the application having transmitted the notification message based on the detected user input.

According to an embodiment of the present disclosure, the memory 240 may store messages undisplayed. For example, the message that has not been displayed for a preset time based on the user activity (e.g., in meeting, purchase product, or inside/outside cafe) may be stored in the memory 240, and messages stored in the memory 240 may be controlled to be displayed by the processor 210 after the preset time.

According to an embodiment of the present disclosure, the user may set whether to receive or display notification message per application by simply entering a particular user input on the notification panel screen without controlling the settings of each of the applications to control whether to receive notification message.

Each of the aforementioned components of the electronic device may include one or more parts, and a name of the part may vary with a type of the electronic device.

The electronic device in accordance with various embodiments of the present disclosure may include at least one of the aforementioned components, omit some of them, or include other additional component(s). Some of the components may be combined into an entity, but the entity may perform the same functions as the components may do.

Figure 3A:
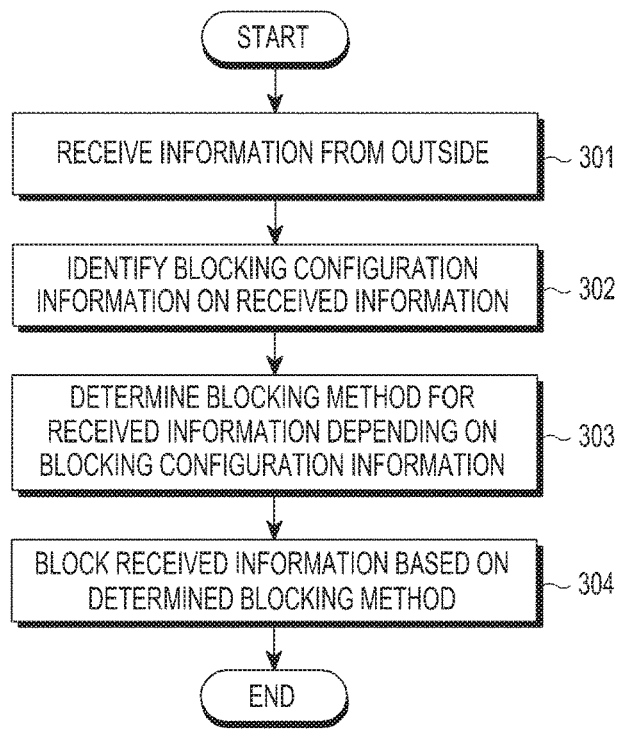
FIG. 3A is a flowchart illustrating an example operation for controlling reception of a message according to an embodiment of the present disclosure.

FIG. 3A is a flowchart illustrating an example operation for controlling reception of a message according to an embodiment of the present disclosure.

Referring to FIG. 3A, in operation 301, the electronic device (e.g., the electronic device 101) may receive information from the outside. For example, the electronic device may receive information, such as message, push message, image, or text, from the outside (e.g., the first peripheral device 102, the second peripheral device 104, or server 106).

In operation 302, the electronic device (e.g. the message reception controller 215) may identify blocking configuration information on the received information. According to an embodiment of the present disclosure, the blocking configuration information may be blocking configuration information set through the user or server (e.g., the server 106). For example, the blocking configuration information may include whether the user sets blocking on the received information. For example, the blocking configuration information may include whether the received information is blocked based on the information received through the server.

According to an embodiment of the present disclosure, the electronic device (e.g., the processor 210) may output an interface (e.g., a notification panel screen) to receive a user input on the received information (e.g., notification message). The electronic device may identify the user input entered on particular information through the interface and may identify the blocking setting of the user on the particular information. For example, the electronic device may determine a blocking method for information received subsequently considering at least a portion blocking-related setting information (e.g., place or time of blocking of received information) in addition to the identified blocking setting.

In operation 303, the electronic device (e.g., the message reception controller 215) may determine a blocking method for received information according to the identified blocking configuration information. According to an embodiment of the present disclosure, the blocking method may be one of a plurality of blocking methods. For example, the electronic device (e.g., the electronic device 101) may select at least one blocking method based on the blocking configuration information among the plurality of blocking methods. According to an embodiment of the present disclosure, the plurality of blocking methods may include blocking, holding, or temporary blocking based on user activity information.

In operation 304, the electronic device (e.g., the message reception controller 215) may block received information based on the determined blocking method. For example, when the blocking method is a method for abstaining from informing the user of the received information, the electronic device might not display the received information to the user. According to an embodiment of the present disclosure, when the blocking method is a method of blocking the received information for a particular period of time (e.g., temporarily), the electronic device may store the received information in the memory (e.g., the memory 130) and may display the information to the user after the particular period time elapses.

For example, according to an embodiment of the present disclosure, the operation method on the electronic device may further identify the information on the channel through which the received information is communicated to identify a method for blocking the channel, and block the received information based on the identified blocking method.

According to an embodiment of the present disclosure, the blocking method may include a method of abstaining from receiving notification on the received information for a particular time or a method for abstaining from displaying the received information.

According to an embodiment of the present disclosure, the operation method on the electronic device may further comprise identifying a user input for the received information, reset the time set to not receive notification on the received information according to the entry of the identified user input, and blocking the received information for the reset time. For example, the blocking operation may further include at least one of determining setting information on the blocking of the received information further based on the user input, identifying user activity information related to the received information, or when the activity information meets a predetermined condition, releasing the blocking of the received information after a predetermined time elapses.

According to an embodiment of the present disclosure, the blocking configuration information may include at least one of prior activity information of the user of at least one for the received information or user input for at least one message related to the received information, information indicating the setting by the user or information related to the text set to be blocked.

According to an embodiment of the present disclosure, the prior activity may include at least one of the position of the user, the operation being run on the electronic device, an input entered by the at least one user through the electronic device, user input for at least one message related to the received information, or the content of at least one message related to the received information. According to an embodiment of the present disclosure, the user activity (e.g., prior activity) may include the location of at least one user, running function or entered input by the at least one user through a corresponding electronic device (e.g., the electronic device 101) or external electronic device (e.g., the first peripheral device 102 or the second peripheral device 104).

According to an embodiment of the present disclosure, the electronic device (e.g., the electronic device 101) may store even reception-blocked messages for a preset time based on the location of the user. For example, when the user is located in a shopping center, the electronic device may perform control to output (e.g., display) at least a portion (e.g., content related to products in the shop) for a preset time among the stored messages depending on whether the blocked message include content related to the shopping center, shops in the shopping center, or products in the shops.

According to an embodiment of the present disclosure, the location of the user may include location information obtained through the GPS module of the electronic device. For example, the location information on the user may include location received from an electronic device communicable with the electronic device or the electronic device worn by the user (e.g., the first peripheral device 102, the second peripheral device 104, or a wearable device).

According to an embodiment of the present disclosure, the electronic device (e.g., the electronic device 101) may perform control to store even a reception-blocked message for a preset time based on the function run by the user through the electronic device. For example, when the user runs a shopping-related function (e.g., shopping application or shopping website), if the blocked message is related to the shopping-related function, the electronic device may perform control to output (e.g., display) the reception-blocked message while the shopping-related function runs.

According to an embodiment of the present disclosure, when a business trip-related schedule is added to the electronic device, the electronic device may perform control to output (e.g., display) at least a portion of the blocked message in relation to the business trip before the schedule passes for the business trip-related message among the blocked messages.

According to an embodiment of the present disclosure, the running function may include various functions executable on the electronic device or settings of the electronic device. For example, the running function may include voice or video call, scheduler, messaging, Internet web surfing, muting in meeting, or running application.

According to an embodiment of the present disclosure, the electronic device (e.g., the electronic device 101) may perform control to store or display, for a preset time, even reception-blocked messages based on a user input through the electronic device (e.g., entry of word, run a particular function, or gesture). For example, the electronic device may perform control to output (e.g., display) at least a portion of the message by determining the correlation between a particular word entered through the electronic device and the blocked message.

According to an embodiment of the present disclosure, the operation method on the electronic device may include at least one of delete, neglect, select, or touch gesture operation for at least one message related to the received information.

According to an embodiment of the present disclosure, the operation method on the electronic device may further include blocking the received information based on the application related to the received information or the weight calculated depending on the type of application.

According to an embodiment of the present disclosure, the operation method may further include setting blocking configuration information or weight based on the blocking-related information obtained from the external electronic device.

According to an embodiment of the present disclosure, the operation method on the electronic device may include storing activity information on at least one message received for the user corresponding to the electronic device or other user, receiving a message authorized to be received by the user from the external device, and when the activity information meets a predetermined condition, temporarily blocking the message.

For example, according to an embodiment of the present disclosure, an operation method on an electronic device may further comprise determining the association with the user for the electronic device and the external device, and when determining that the electronic device has a higher association with the user than the external device, performing control so that the notification message related to the external device stops being transferred to the external device.

Figure 3B:
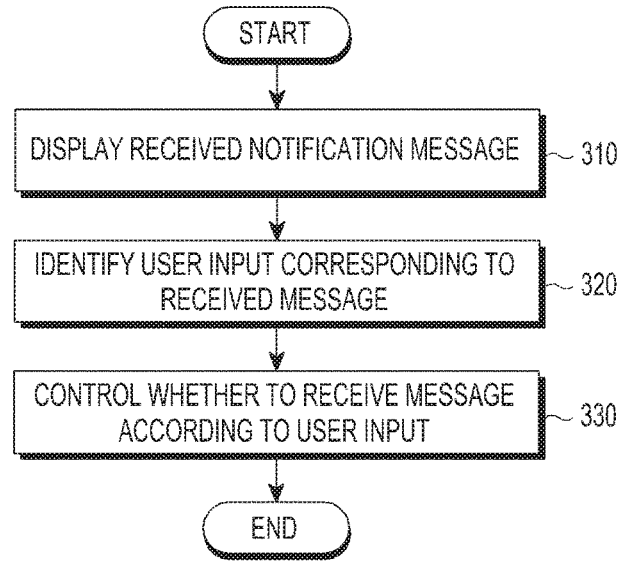
FIG. 3B is a flowchart illustrating an example operation for controlling reception of a message according to an embodiment of the present disclosure.

FIG. 3B is a flowchart illustrating an example operation for controlling reception of a message according to an embodiment of the present disclosure.

Referring to FIG. 3B, in operation 310, the electronic device (e.g., the message display controller 216) may display a plurality of notification messages received from a plurality of applications through the notification panel screen.

In operation 320, the electronic device (e.g., the user input detecting unit 212) may identify the user input entered on at least one of notification messages displayed on the notification panel screen.

In operation 330, the electronic device (e.g., message data identifying unit 213, weight calculating unit 214, or a combination thereof) may control the reception of message related to the at least one notification message having the user input entered thereon, corresponding to the detected user input. For example, the user input may include at least one of various gesture inputs entered through the notification panel screen.

Figure 4:
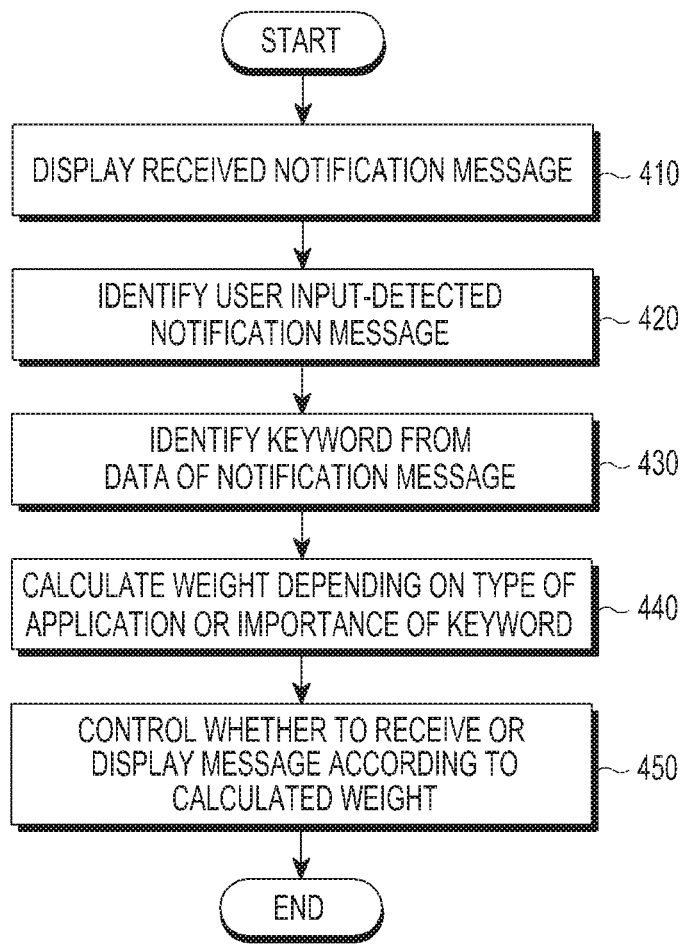
FIG. 4 is a flowchart illustrating an example operation for controlling reception of a message according to an embodiment of the present disclosure.

FIG. 4 is a flowchart illustrating an example operation for controlling reception of a message according to an embodiment of the present disclosure.

Referring to FIG. 4, in operation 410, the electronic device (e.g., electronic device 101) may display a plurality of notification messages received from a plurality of applications through the notification panel screen. For example, the plurality of received notification messages may be received from the server providing information related to at least a portion of the functions of the plurality of applications.

According to an embodiment of the present disclosure, the electronic device (e.g., the electronic device 101) may display the plurality of notification messages received from the plurality of applications on a display (e.g., the display 160) in the form of a popup window.

In operation 420, the electronic device may identify the user input-detected notification message. For example, the electronic device may identify the detected user input or data included in the user input-detected notification message.

According to an embodiment of the present disclosure, the electronic device may identify, as the user input-detected notification message data, information on the application having transmitted the notification message, information received from the server of the application (e.g., type of application, count of transmission, or policy of application) or content of notification message (e.g., text, image, or link).

In operation 430, the electronic device may identify a keyword from the data of the user input-entered notification message. For example, the keyword may include at least one word of the type of the application or text data of the notification message. For example, the electronic device may control whether to receive or display notification messages transmitted from a particular application based on the identified keyword.

In operation 440, the electronic device (e.g., the message reception controller 215) may calculate the weight for a particular application or particular text data depending on the importance of the identified keyword or identified type of application. For example, the electronic device may calculate the weight based on the type of application, such as game, stock, weather, bank, message, advertisement, shopping, cafe, or healthcare, or the importance of a particular keyword per application or association with the user's activity (e.g., conference, exercise, shopping or other user activities based on the information obtained through a sensor of the electronic device (e.g., the electronic device 101) or peripheral device (e.g., the peripheral devices 102 and 104)), status of notification message, whether particular is included (e.g., disaster information, weather information, emergency information, advertisement information, social issue-related information, or stock information) or association with an external device.

In operation 450, the electronic device may control whether to receive or display notification message from the application having transmitted the user input-entered message depending on the calculated weight. For example, a low weight may be calculated for the keyword related to the application of high importance (e.g., bank, health-care, or security application) or emergency information (e.g., abrupt variation in health condition, emergency), so that despite entry of a user input the notification message from the corresponding application may be received. By contrast, a higher weight may be calculated for the keyword of low importance (e.g., loan or advertisement), so that when a user input is first entered, the electronic device may perform control to abstain from receiving or displaying on the notification panel screen notification messages from the corresponding application.

Figure 5:
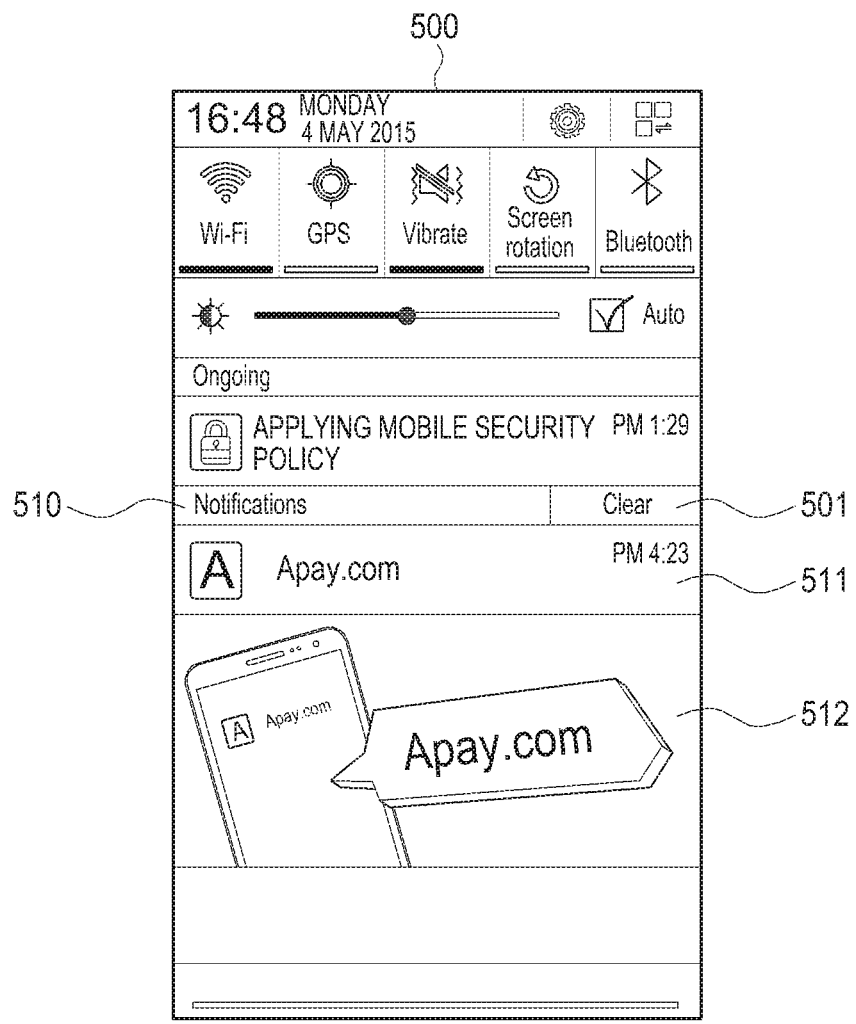
FIG. 5 is a view illustrating an example notification panel screen according to an embodiment of the present disclosure.

FIG. 5 is a view illustrating an example notification panel screen according to an embodiment of the present disclosure.

Referring to FIG. 5, the notification panel screen 500 may include a notification window 510 displaying received notification messages. The notification window 510 may include a button 501 for deleting (clearing) all of the displayed notification messages or at least one notification message (e.g., 511 or 512) transmitted from at least one application.

According to an embodiment of the present disclosure, the at least one notification message (e.g., 511 or 512) may include and display the information on the application or time of reception, such as a first notification message 511, or may include and display an image, such as a second notification message 512.

Figure 6:
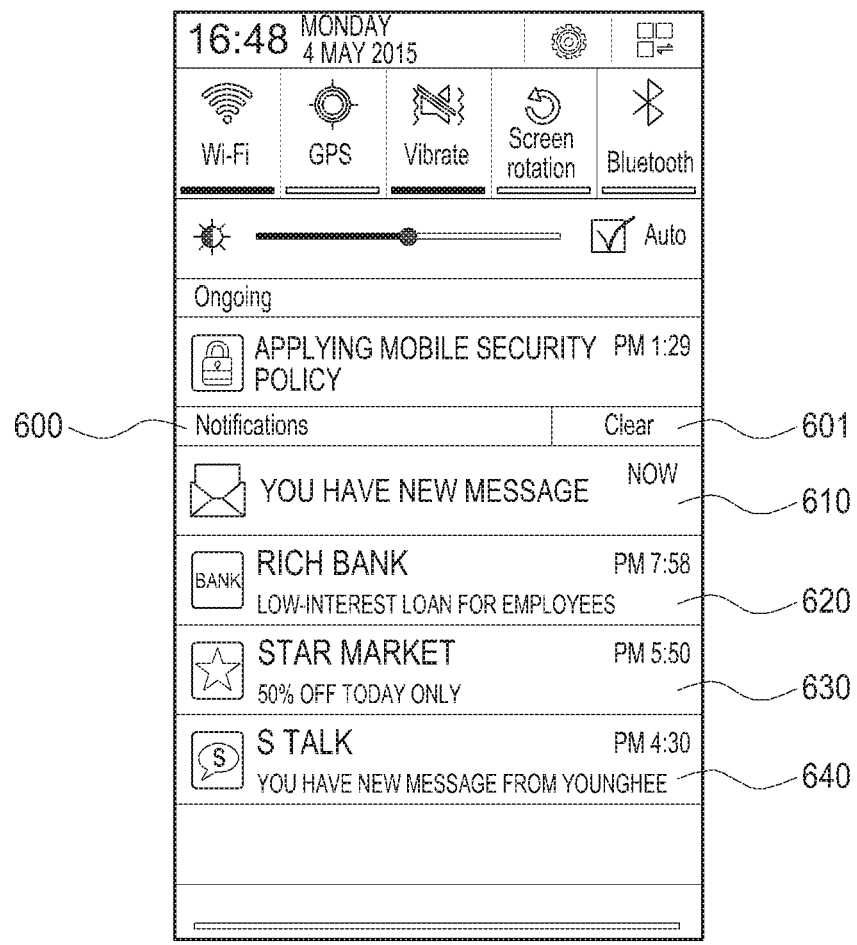
FIG. 6 is a view illustrating an example notification panel screen according to an embodiment of the present disclosure.

FIG. 6 is a view illustrating an example notification panel screen according to an embodiment of the present disclosure.

Referring to FIG. 6, the notification panel screen may include a notification window 600 displaying received notification messages.

The notification window 600 may include a button 601 for deleting (clearing) all of the displayed notification messages or at least one notification message (e.g., 610, 620, 630, or 640) transmitted from at least one application.

According to an embodiment of the present disclosure, the user may identify the at least one notification message (e.g., 610, 620, 630, or 640) and may enter a user input on a notification message to be controlled for reception or display. For example, the user input may include a preset type of gesture input (e.g., touch, drag, pinch-in or pinch-out).

According to an embodiment of the present disclosure, as the user enters the user input on a particular notification message through the notification panel screen, whether to receive notification message per application may be controlled.

Figure 7:
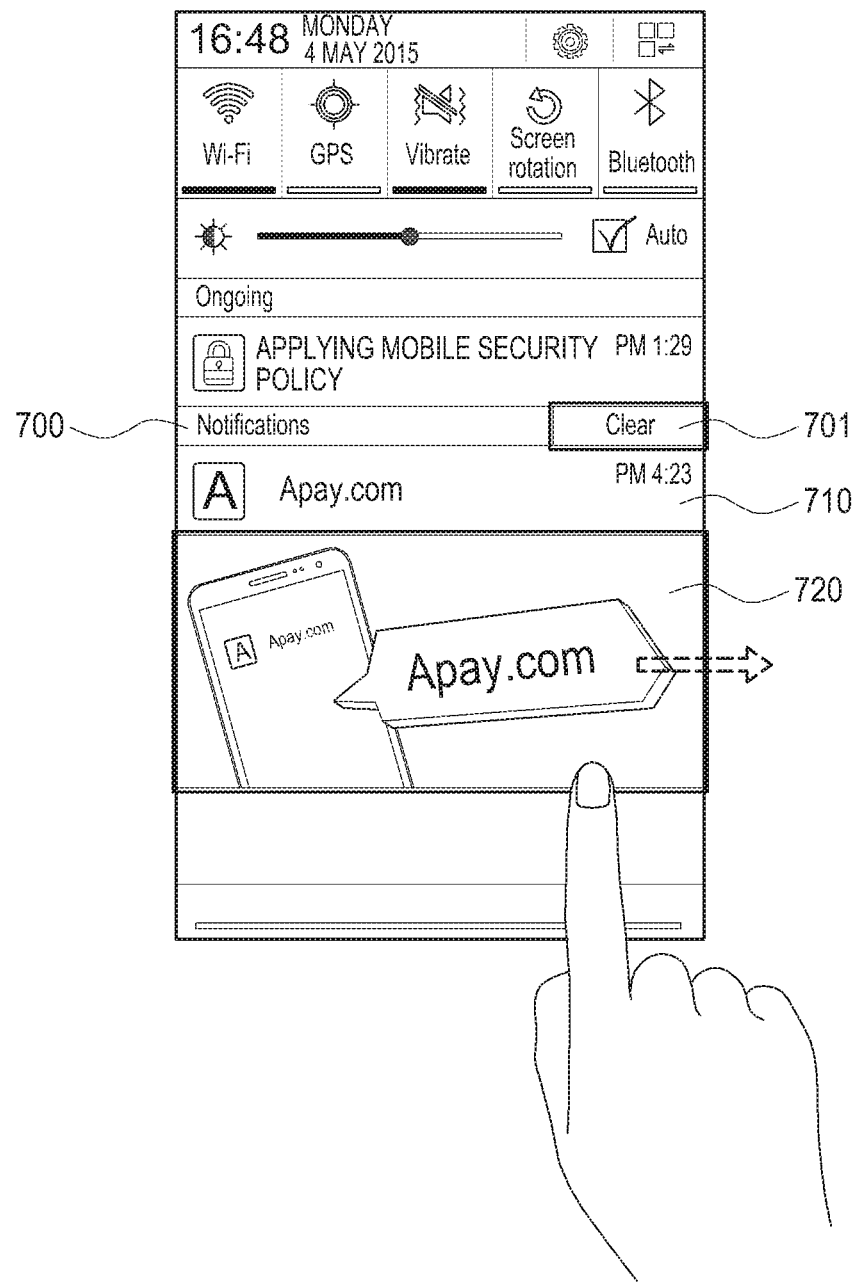
FIG. 7 is a view illustrating an example notification panel screen according to an embodiment of the present disclosure.

FIG. 7 is a view illustrating an example notification panel screen according to an embodiment of the present disclosure.

Referring to FIG. 7, the notification panel screen may include a notification window 700 displaying received notification messages.

The notification window 700 may include a button 701 for deleting (clearing) all of the displayed notification messages or at least one notification message (e.g., 710 or 720) transmitted from at least one application. Although not shown, according to an embodiment of the present disclosure, the at least one notification message may include a button for deleting each notification message.

According to an embodiment of the present disclosure, the user may identify the at least one notification message (e.g., 710 or 720) and may enter a user input (e.g., gesture input in the form of slide or tap) on a notification message to be controlled for reception or display.

According to an embodiment of the present disclosure, when the user enters a gesture (e.g., slide gesture) on the notification message 720, the display of the notification message 720 may be removed from the notification panel screen. For example, the notification message 720 may include an image, and when a slide gesture is entered on the notification message including the image, the display of the notification message may be controlled to be deleted from the notification panel screen.

According to an embodiment of the present disclosure, when the notification message 720 includes advertisement information, the weight for the application having transmitted the notification message 720 may be calculated, and although a notification message is received from the application, the received notification message may be controlled to not be displayed on the notification panel screen depending on the calculated weight.

According to an embodiment of the present disclosure, the notification message may be controlled to be temporarily stopped from being displayed for a particular time based on the calculated weight. For example, when the notification message 720 is a message (e.g., notification for attending meeting stored in the scheduler) associated with an activity that the user is now taking (e.g., attending a meeting), the activity-related message may be controlled to abstain from being displayed on the notification panel screen for a pre-determined time (e.g., until the meeting session ends).

According to an embodiment of the present disclosure, although a user input for controlling reception is entered on a particular notification message, whether to display the notification message may be reset depending on the importance of the application or the correlation between the notification message and the user's activity (e.g., exercise, call, or attending a meeting).

Figure 8:
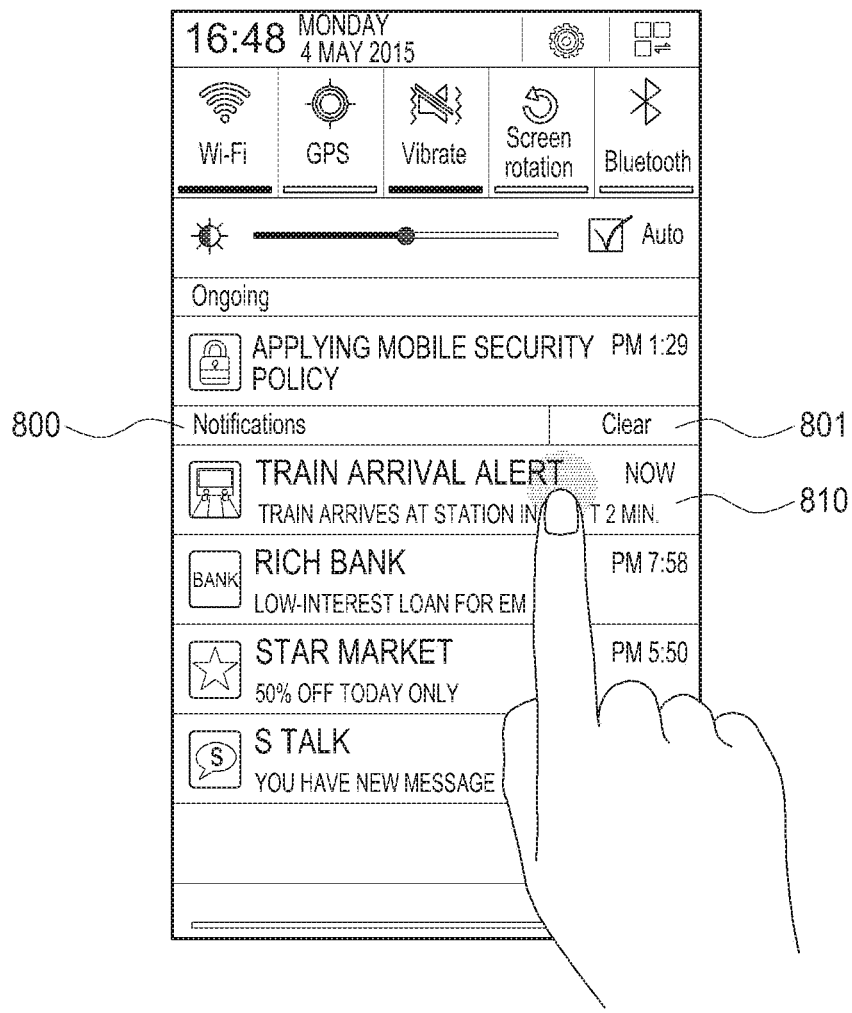
FIG. 8 is a view illustrating an example notification panel screen according to an embodiment of the present disclosure.

FIG. 8 is a view illustrating an example notification panel screen according to an embodiment of the present disclosure.

Referring to FIG. 8, the notification panel screen may include a notification window 800 displaying received notification messages.

The notification window 800 may include a button 801 for deleting (clearing) at least one of all of the displayed notification messages or at least one notification message (e.g., 810) transmitted from at least one application.

According to an embodiment of the present disclosure, the user may enter a tap-type gesture as an example of user input on the at least one notification message (e.g., 810). For example, the notification message 810 may be transmitted through an application indicating the arrival time of a train and may include the information of arrival time of train.

According to an embodiment of the present disclosure, the tap gesture may be an input instructing to run the application related to the notification message. The application having transmitted the notification message 810 may be run, and the information related to the content included in the notification message 810 may be displayed. For example, since the tap gesture is not a gesture for controlling the reception or display of notification message, the electronic device may perform control to thereafter receive and display notification messages from the application.

Figure 9:
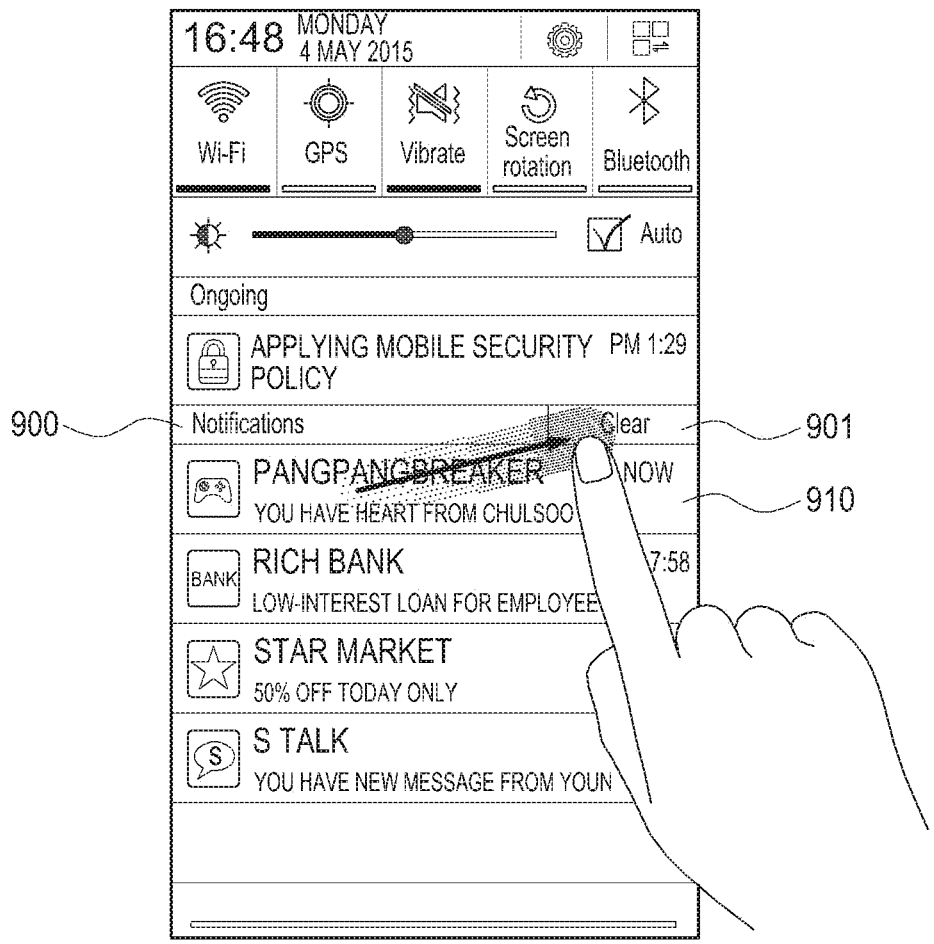
FIG. 9 is a view illustrating an example notification panel screen according to an embodiment of the present disclosure.

FIG. 9 is a view illustrating an example notification panel screen according to an embodiment of the present disclosure.

Referring to FIG. 9, the notification panel screen may include a notification window 900 displaying received notification messages.

The notification window 900 may include a button 901 for deleting (clearing) all of the displayed notification messages or at least one notification message (e.g., 910) transmitted from at least one application.

According to an embodiment of the present disclosure, the user may enter a drag and drop gesture of tapping the particular notification message (e.g., 910) and dragging up to the button 910. For example, the notification message 910 may be transmitted through a game application and may include information indicating that a game item arrives.

According to an embodiment of the present disclosure, the drag and drop gesture may be an input for controlling the reception of the notification message, and the electronic device, upon identifying the drag and drop gesture from the notification message 910 to the button 901, may perform control to abstain from receiving notification messages from the application having transmitted the notification message 910.

Figure 10:
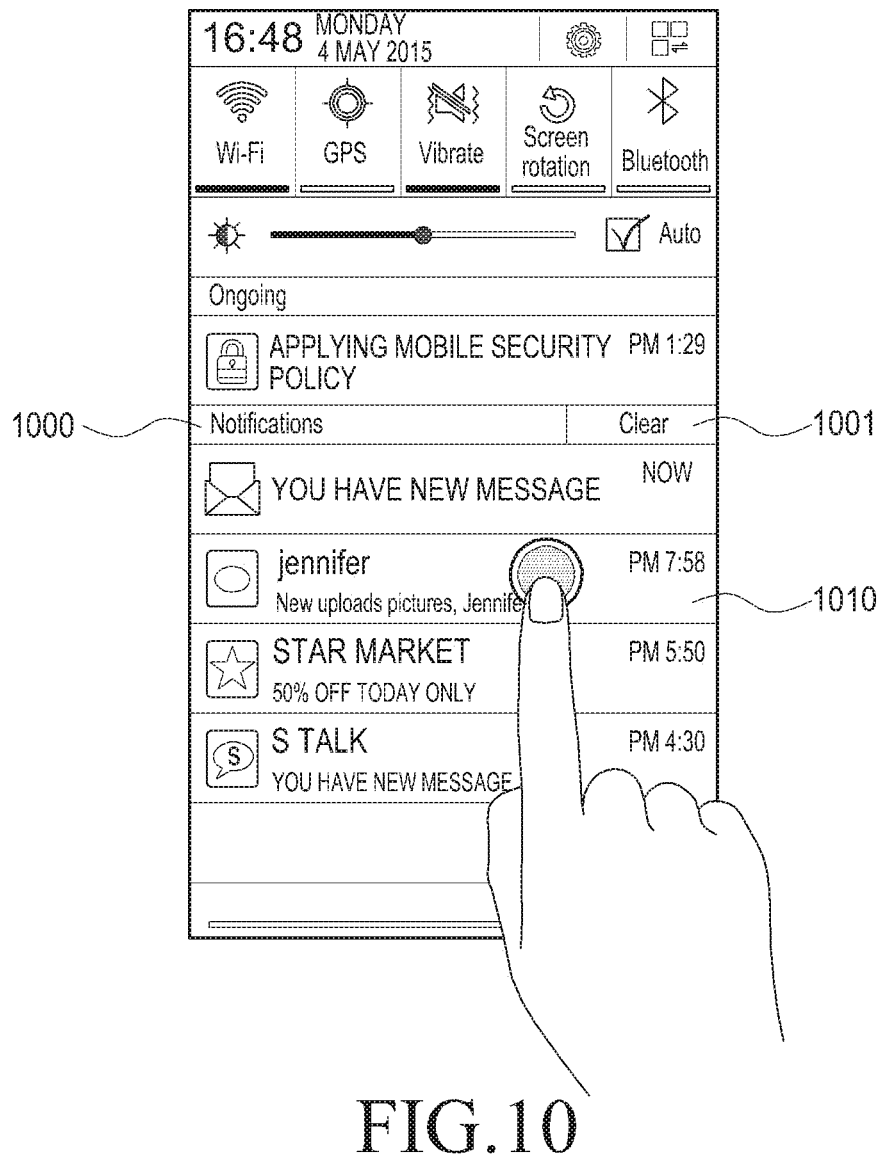
FIG. 10 is a view illustrating an example notification panel screen according to an embodiment of the present disclosure.

FIG. 10 is a view illustrating an example notification panel screen according to an embodiment of the present disclosure.

Referring to FIG. 10, the notification panel screen may include a notification window 1000 displaying received notification messages (e.g., 1010).

The notification window 1000 may include a button 1001 for deleting (clearing) at least one of all of the displayed notification messages or at least one notification message (e.g., 1010) transmitted from at least one application.

According to an embodiment of the present disclosure, the user may input a double tap gesture of clicking a particular notification message (e.g., 1010) twice. For example, the notification message 1010 may be transmitted from an application providing a SNS and may include information indicating that content is uploaded from other user.

According to an embodiment of the present disclosure, the double tap gesture is an input for controlling the reception of the notification message, and the electronic device, upon identifying the double tap gesture for the notification message 1010, may perform control to abstain from receiving notification messages related to the notification message 1010 among notification messages transmitted from the application.

According to an embodiment of the present disclosure, the application providing the SNS may provide various notification messages. For example, the type of notification messages may include an add friend request message, a message indicating upload of new content, or a message indicating being friend with a new user, or other various SNS-related information.

According to an embodiment of the present disclosure, the electronic device may identify the data of the notification message where the double tap gesture has been entered and may extract a keyword from the notification message. For example, the electronic device may identify the keyword "picture" or "upload" from the notification message 1010 to determine the type of notification message.

According to an embodiment of the present disclosure, the electronic device may perform control to abstain from receiving the notification message corresponding to the determined type of notification message from among the notification messages of the type transmitted from the application.

According to an embodiment of the present disclosure, the user may perform control to abstain from receiving only notification messages corresponding to a particular classification among notification messages of various types transmitted from a particular application by simply entering a user input on the particular notification message.

Figure 11:
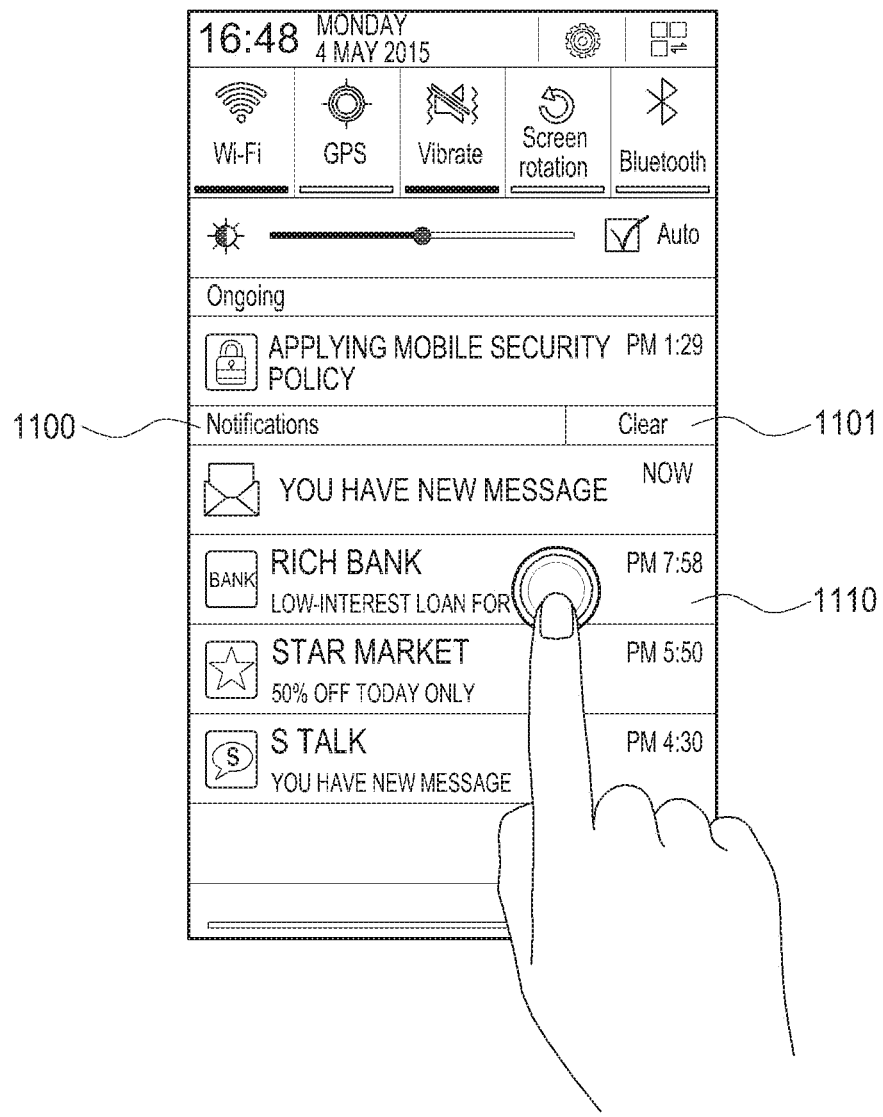
FIG. 11 is a view illustrating an example notification panel screen according to an embodiment of the present disclosure.

FIG. 11 is a view illustrating an example notification panel screen according to an embodiment of the present disclosure.

The notification window 1100 may include a button 1101 for deleting (clearing) at least one of all of the displayed notification messages or at least one notification message (e.g., 1110) transmitted from at least one application.

Referring to FIG. 11, the notification panel screen may include a notification window 1100 displaying received notification messages (e.g., 1110).

According to an embodiment of the present disclosure, the user may input a triple tap gesture of clicking a particular notification message (e.g., 1110) three times. For example, the notification message 1110 may be transmitted through a bank application and may include information advertising loans.

According to an embodiment of the present disclosure, the triple tap gesture is an input for controlling the reception of the notification message, and the electronic device, upon identifying the triple tap gesture for the notification message 1110, may perform control to abstain from receiving notification messages from the application having transmitted the notification message 1110.

According to an embodiment of the present disclosure, the user may perform control to abstain from receiving notification messages from a particular application by simply entering a user input on the particular notification message.

Figure 12:
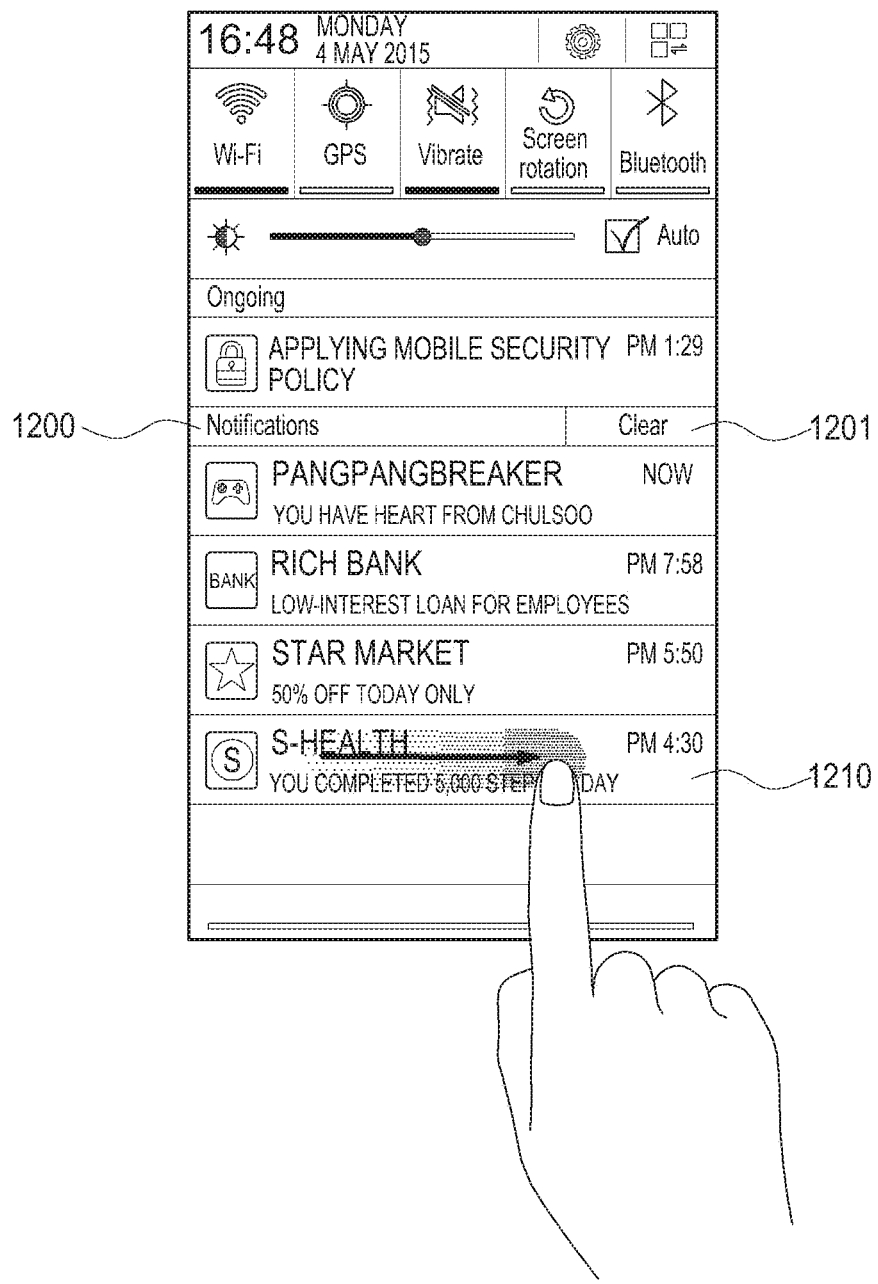
FIG. 12 is a view illustrating an example notification panel screen according to an embodiment of the present disclosure.

FIG. 12 is a view illustrating an example notification panel screen according to an embodiment of the present disclosure.

Referring to FIG. 12, the notification panel screen may include a notification window 1200 displaying received notification messages (e.g., 1210).

The notification window 1200 may include a button 1201 for deleting (clearing) at least one of all of the displayed notification messages or at least one notification message (e.g., 1210) transmitted from at least one application.

According to an embodiment of the present disclosure, the user may enter a slide gesture on a particular notification message (e.g., 1210). For example, the notification message 1210 may be transmitted through a health-care application and may include information related to the user's motion.

According to an embodiment of the present disclosure, the slide gesture may be an input for controlling the display of the notification message, and the electronic device, upon identifying the slide gesture on the notification message 1210, may delete the notification message 1210 from the display.

According to an embodiment of the present disclosure, although the slide gesture is entered on the notification message 1210 and thus the notification message 1210 is deleted from display, notification messages thereafter transmitted from the health-care application may be displayed through the notification window 1200.

Figure 13:
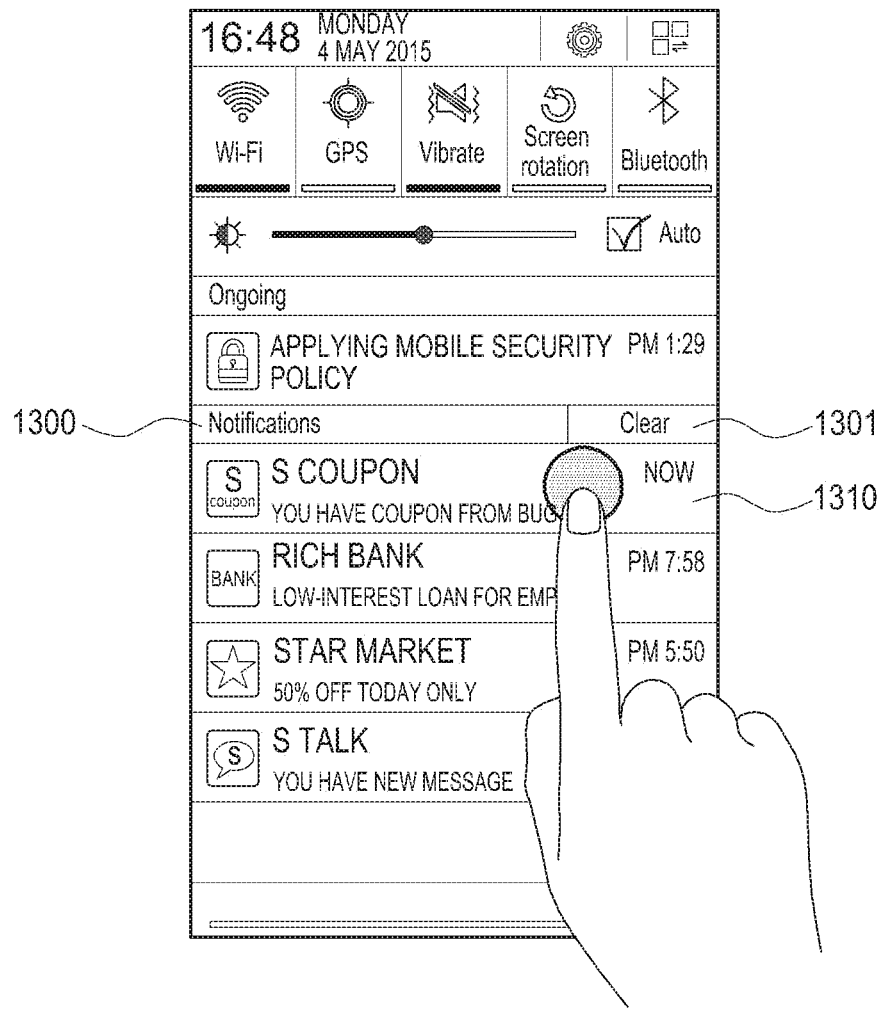
FIG. 13 is a view illustrating an example notification panel screen according to an embodiment of the present disclosure.

FIG. 13 is a view illustrating an example notification panel screen according to an embodiment of the present disclosure.

Referring to FIG. 13, the notification panel screen may include a notification window 1300 displaying received notification messages (e.g., 1310).

The notification window 1300 may include a button 1301 for deleting (clearing) at least one of all of the displayed notification messages or at least one notification message (e.g., 1310) transmitted from at least one application.

According to an embodiment of the present disclosure, the user may input a long tap gesture of clicking long a particular notification message (e.g., 1310) twice. For example, the notification message 1310 may be transmitted from an application providing coupons of various brands and may include information indicating that a particular brand of coupon is received.

According to an embodiment of the present disclosure, the long tap gesture is an input for controlling the display of the notification message, and the electronic device, upon identifying the long tap gesture for the notification message 1310, may perform control to abstain from displaying notification messages from the application.

According to an embodiment of the present disclosure, the application providing the coupon service may provide various notification messages related to various brands. For example, the notification message may include text data indicating a particular brand.

According to an embodiment of the present disclosure, the electronic device may identify the data of the notification message where the long tap gesture has been entered and may extract a keyword from the notification message. For example, the electronic device may identify brand information (e.g., "Burgerking") as a keyword of the notification message 1310.

According to an embodiment of the present disclosure, the electronic device may perform control to abstain from displaying notification messages including the keyword (e.g., "Burgerking") among notification messages including various brands of coupon information transmitted from the application.

According to an embodiment of the present disclosure, although receiving notification messages including various brands of coupon information from the application, the electronic device may perform control to abstain from displaying through the notification panel screen the notification messages including the extracted keyword.

Figure 14:
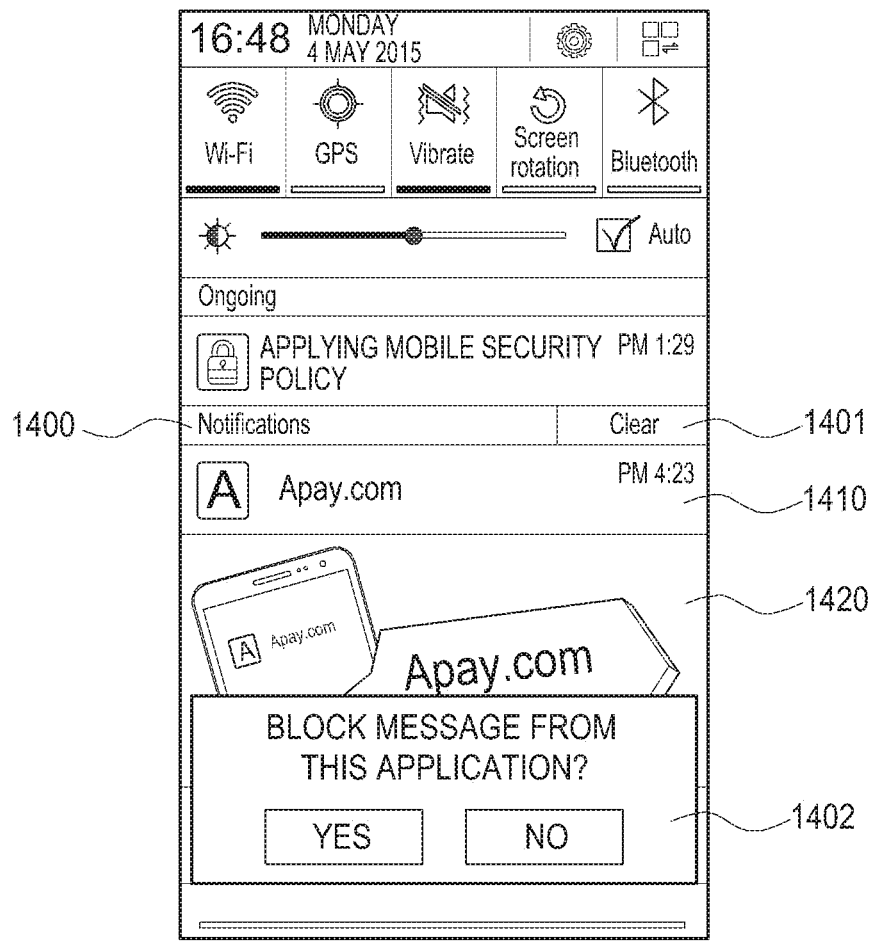
FIG. 14 is a view illustrating an example notification panel screen according to an embodiment of the present disclosure.

FIG. 14 is a view illustrating an example notification panel screen according to an embodiment of the present disclosure.

Referring to FIG. 14, the notification panel screen may include a notification window 1400 displaying received notification messages (e.g., 1410).

The notification window 1400 may include a button 1401 for deleting (clearing) at least one of all of the displayed notification messages or at least one notification message (e.g., 1410, 1420) transmitted from at least one application According to an embodiment of the present disclosure, when the user enters a user input for controlling the reception of notification message, the electronic device may display a confirm message 1402 depending on the type of application having transmitted the notification message. For example, the confirm message 1402 may include content inquiring about whether to block messages received from the application or a button for the user to select a response to the content (e.g., selection button "Yes" or "No").

According to an embodiment of the present disclosure, when the notification message (e.g., 1410) is in a neglect state, the electronic device may display the confirm message 1402 to inquire the user about whether to control the reception of the notification message (e.g., 1410). For example, when no user input is entered on the notification message 1410 for a preset time or when user input is received by a predetermined number of times or more but is not entered on the notification message 1410, the electronic device may determine that the notification message 1410 is in the neglect state.

According to an embodiment of the present disclosure, the electronic device may display the confirm message 1402 upon entry of a user input for controlling the receipt for notification messages providing high-importance information such as bank, financial, or security. For example, although the user mistakenly enters a particular gesture, the electronic device may inquire the user about whether to control the reception for the corresponding application by displaying the confirm message 1402 on the particular application.

Figure 15:
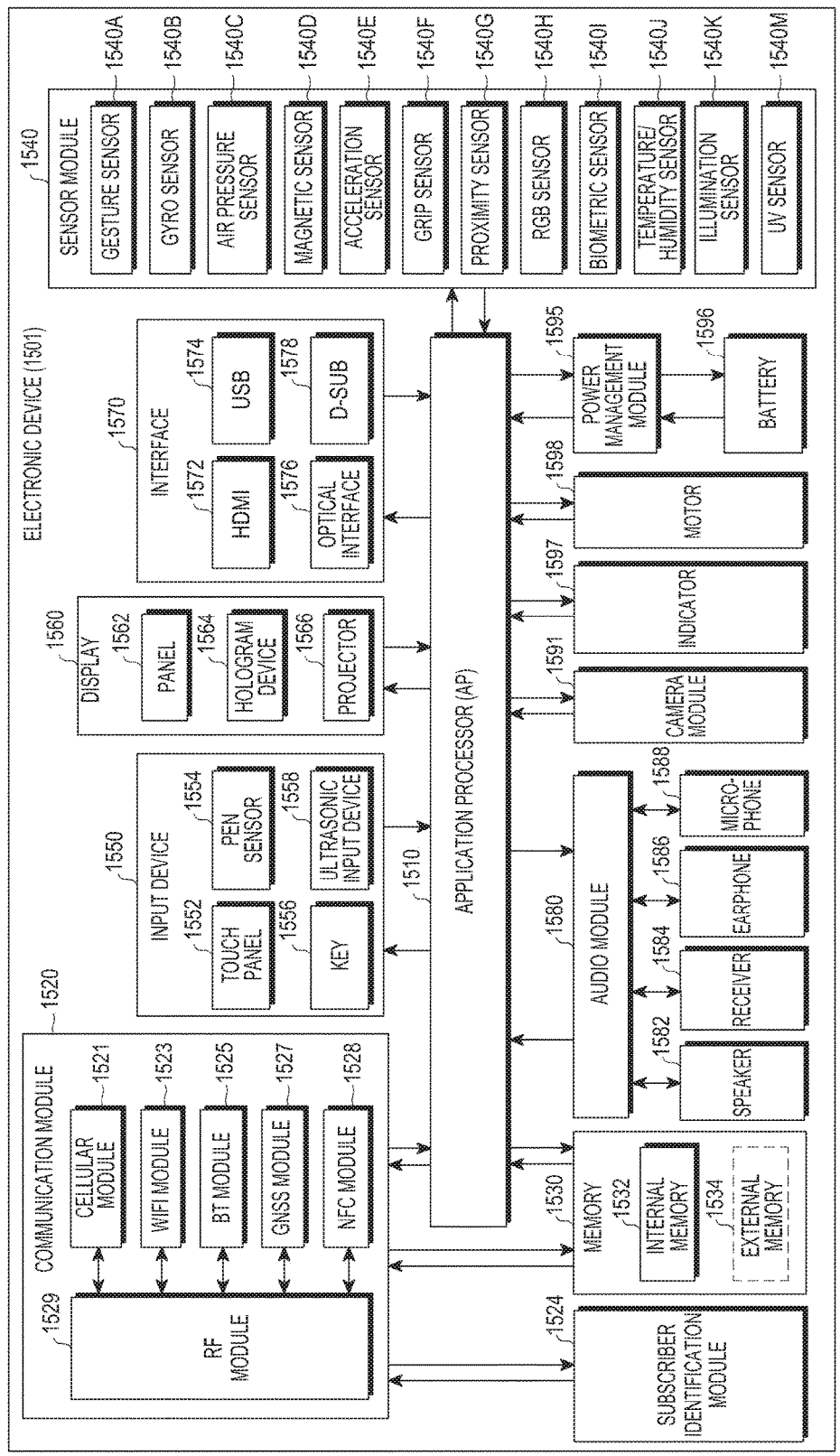
FIG. 15 is a block diagram illustrating an example configuration of an electronic device according to an embodiment of the present disclosure.

FIG. 15 is a block diagram illustrating an example configuration of an electronic device (e.g., the electronic device 101) according to an embodiment of the present disclosure.

Referring to FIG. 15, the electronic device 1501 may include one or more processors (e.g., APs) 1510, a communication module 1520, a subscriber identification module (SIM) 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may control multiple hardware and software components connected to the processor 1510 by running, e.g., an OS or application programs, and the processor 210 may process and compute various data. The processor 1510 may be implemented in, e.g., a system on chip (SoC). According to an embodiment of the present disclosure, the processor 1510 may further include a graphic processing unit (GPU) and/or an image signal processor (ISP). The processor 1510 may include at least some (e.g., the processor 120 or processor 210) of the components shown in FIG. 1 or 2. The processor 1510 may load a command or data received from at least one of other components (e.g., a non-volatile memory) on a volatile memory, process the command or data, and store various data in the non-volatile memory.

According to an embodiment of the present disclosure, the processor 1510, when detecting an application end event to end the running application that is generated according to the state of the electronic device 1501 while the application is running on the electronic device 1501, may perform control to transmit the data of the running application so that the data of the running application is processed by the external electronic device.

The communication module 1520 may have the same or similar configuration to the communication interface 150 of FIG. 1 or communication unit 220. The communication module 1520 may include, e.g., a cellular module 1521, a Wi-Fi module 1523, a BT module 1525, a GNSS module 1527 (e.g., a GPS module, a Glonass module, a Beidou module, or a Galileo module), an NFC module 1528, and a radio frequency (RF) module 1529.

The cellular module 1521 may provide voice call, video call, text, or Internet services through, e.g., a communication network. The cellular module 1521 may perform identification or authentication on the electronic device 1501 in the communication network using a SIM 1524 (e.g., the SIM card). According to an embodiment of the present disclosure, the cellular module 1521 may perform at least some of the functions providable by the processor 1510. According to an embodiment of the present disclosure, the cellular module 1521 may include a CP.

The Wi-Fi module 1523, the BT module 1525, the GNSS module 1527, or the NFC module 1528 may include a process for, e.g., processing data communicated through the module. At least some (e.g., two or more) of the cellular module 1521, the Wi-Fi module 1523, the BT module 1525, the GNSS module 1527, or the NFC module 1528 may be included in a single integrated circuit (IC) or an IC package.

The RF module 1529 may communicate data, e.g., communication signals (e.g., RF signals). The RF module 1529 may include, e.g., a transceiver, a power amplifier module (PAM), a frequency filter, a low noise amplifier (LNA), or an antenna. According to an embodiment of the present disclosure, at least one of the cellular module 1521, the Wi-Fi module 1523, the BT module 1525, the GNSS module 1527, or the NFC module 1528 may communicate RF signals through a separate RF module.

The subscription identification module 1524 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 1530 (e.g., the memory 130 or storage unit 340) may include, e.g., an internal memory 1532 or an external memory 1534. The internal memory 1532 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1534 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 1534 may be functionally and/or physically connected with the electronic device 1501 via various interfaces.

For example, the sensor module 1540 may measure a physical quantity or detect an operational state of the electronic device 1501, and the sensor module 240 may convert the measured or detected information into an electrical signal. The sensor module 1540 may include at least one of, e.g., a gesture sensor 1540A, a gyro sensor 1540B, an air pressure sensor 1540C, a magnetic sensor 1540D, an acceleration sensor 1540E, a grip sensor 1540F, a proximity sensor 1540G, a color sensor 1540H such as a red-green-blue (RGB) sensor, a bio sensor 1540I, a temperature/humidity sensor 1540J, an illumination sensor 1540K, or an ultra violet (UV) sensor 1540M. Additionally or alternatively, the sensing module 1540 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1540 may further include a control circuit for controlling at least one or more of the sensors included in the sensing module. According to an embodiment of the present disclosure, the electronic device 1501 may further include a processor configured to control the sensor module 1540 as part of the processor 1510 or separately from the processor 1510, and the electronic device 2701 may control the sensor module 1540 while the processor 210 is in a sleep mode.

The input unit 1550 may include, e.g., a touch panel 1552, a (digital) pen sensor 1554, a key 1556, or an ultrasonic input device 1558. The touch panel 1552 may use at least one of capacitive, resistive, infrared, or ultrasonic methods. The touch panel 1552 may further include a control circuit. The touch panel 1552 may further include a tactile layer and may provide a user with a tactile reaction.

The (digital) pen sensor 1554 may include, e.g., a part of a touch panel or a separate sheet for recognition. The key 1556 may include e.g., a physical button, optical key or key pad. The ultrasonic input device 1558 may sense an ultrasonic wave generated from an input tool through a microphone (e.g., the microphone 1588) to identify data corresponding to the sensed ultrasonic wave.

The display 1560 (e.g., the display 160 or display unit 330) may include a panel 1562, a hologram device 1564, or a projector 1566. The panel 1562 may have the same or similar configuration to the display 160 or display unit 330. The panel 1562 may be implemented to be flexible, transparent, or wearable. The panel 1562 may also be incorporated with the touch panel 1552 in a module. The hologram device 1564 may make three dimensional (3D) images (holograms) in the air by using light interference. The projector 1566 may display an image by projecting light onto a screen. The screen may be, for example, located inside or outside of the electronic device 1501. In accordance with an embodiment, the display 1560 may further include a control circuit to control the panel 1562, the hologram device 1564, or the projector 1566.

The interface 1570 may include e.g., an HDMI 1572, a USB 1574, an optical interface 1576, or a D-subminiature (D-sub) 1578. The interface 1570 may be included in e.g., the communication interface 150 shown in FIG. 1. Additionally or alternatively, the interface 1570 may include a mobile high-definition link (MHL) interface, an SD card/multimedia card (MMC) interface, or IrDA standard interface.

The audio module 1580 may convert a sound into an electric signal or vice versa, for example. At least a part of the audio module 1580 may be included in e.g., the input/output interface 150 as shown in FIG. 1. The audio module 1580 may process sound information input or output through e.g., a speaker 1582, a receiver 1584, an earphone 1586, or a microphone 1588.

For example, the camera module 1591 may be a device for capturing still images and videos, and may include, according to an embodiment of the present disclosure, one or more image sensors (e.g., front and back sensors), a lens, an ISP, or a flash such as an LED or xenon lamp.

The power manager module 1595 may manage power of the electronic device 1501, for example. Although not shown, according to an embodiment of the present disclosure, the power manager module 1595 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1596, a voltage, a current, or a temperature while the battery 296 is being charged. The battery 1596 may include, e.g., a rechargeable battery or a solar battery.

The indicator 1597 may indicate a particular state of the electronic device 1501 or a part (e.g., the processor 1510) of the electronic device, including e.g., a booting state, a message state, or recharging state. The motor 1598 may convert an electric signal to a mechanical vibration and may generate a vibrational or haptic effect. Although not shown, a processing unit for supporting mobile TV, such as a GPU may be included in the electronic device 1501. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

According to an embodiment of the present disclosure, the electronic device includes a memory for storing information received from an outside or blocking configuration information for each piece of information and a processor. The processor may, when receiving information from outside of the electronic device, identify blocking configuration information on the received information, determine a method for blocking the received information according to the blocking configuration information, and block the received information based on the determined blocking method.

For example, according to an embodiment of the present disclosure, the processor 1510 may identify the information on the channel through which the received information is communicated to identify a method for blocking the channel, and block the received information based on the identified blocking method.

For example, according to an embodiment of the present disclosure, the processor 1510 may block the received information through at least one of a method of stopping displaying a notification for the received for a particular time or a method for controlling to not display the received information.

For example, according to an embodiment of the present disclosure, the processor 1510 may identify a user input for the received information, reset the time specified to not display the notification according to the identified user input, and block the received information for the reset time.

For example, according to an embodiment of the present disclosure, the blocking configuration information may include information on at least one prior activity of the user for at least one message related to the received information, information indicating whether to be set by the user, or information related to text set to be blocked.

For example, according to an embodiment of the present disclosure, the prior activity may include at least one of the position of the user, the operation being run on the electronic device, an input entered by the user through the electronic device, at least one prior activity of the user for at least one message related to the received information, or the content of at least one message related to the received information.

For example, according to an embodiment of the present disclosure, the user input may include at least one of delete, neglect, select, or touch gesture operation for at least one message related to the received information.

For example, according to an embodiment of the present disclosure, the processor 1510 may identify the blocking configuration information set based on at least a portion of information on the application related to the received information or blocking-related information obtained in relation to the received information.

For example, according to an embodiment of the present disclosure, the electronic device 1501 may further include a memory for storing information on at least one activity of the user for the received message, and the processor may at least temporarily block the received message when the activity information meets a predetermined condition.

For example, according to an embodiment of the present disclosure, the processor 1510 may abstain from displaying the received message through the display operatively connected with the electronic device based on the activity information or abstain from transmitting the message to other electronic device operatively connected with the electronic device.

For example, according to an embodiment of the present disclosure, the processor 1510 may release the temporary blocking of the message after a preset time based on the activity information.

For example, according to an embodiment of the present disclosure, the processor 1510 may display at least a portion of the block-released message on the display operatively connected with the electronic device.

For example, according to an embodiment of the present disclosure, the electronic device may determine the association with the user for the electronic device and the external device, when determining that the electronic device has a higher association with the user than the external device, may perform control so that the notification message related to the external device stops being transferred to the external device.

Figure 16:
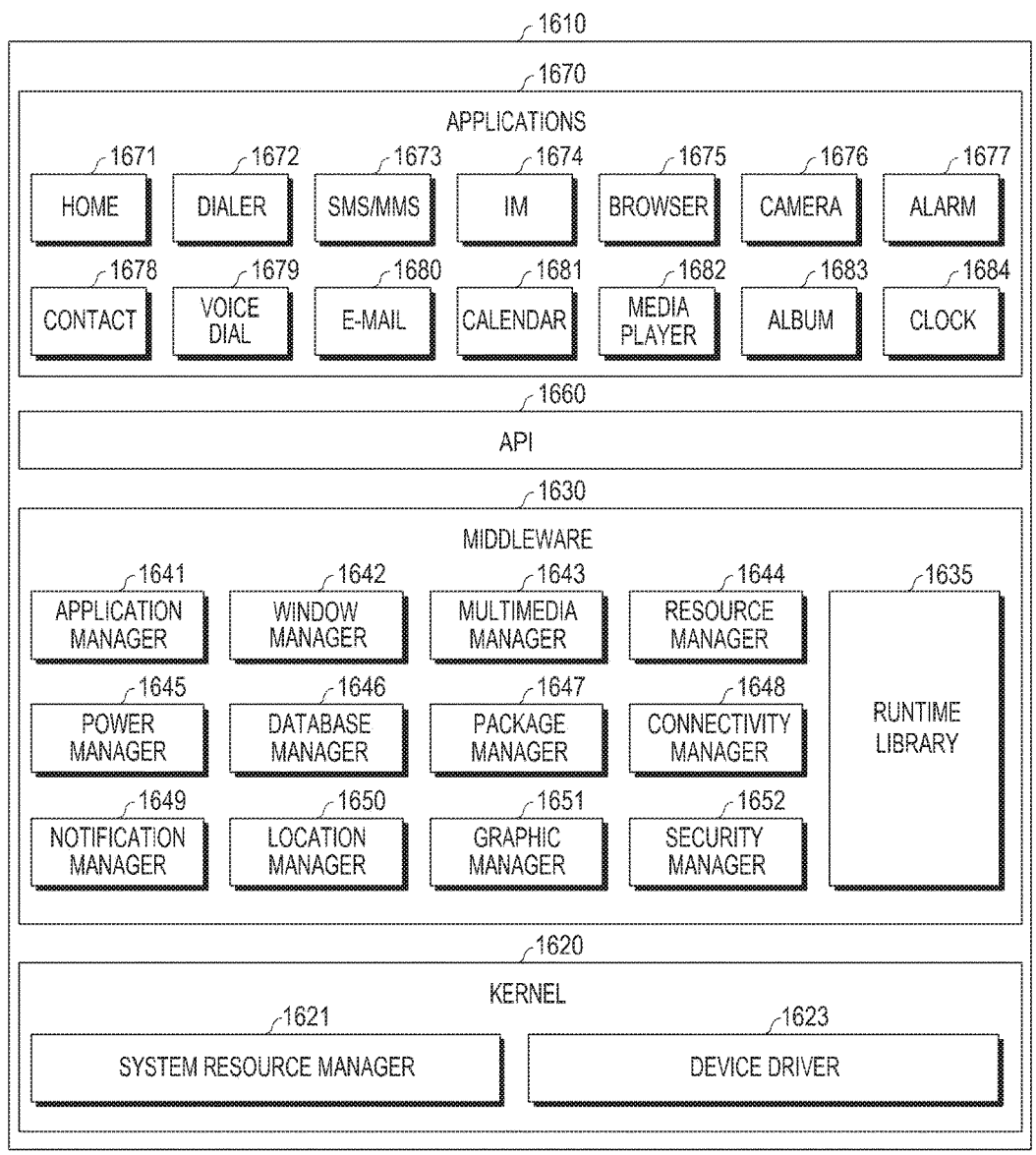
FIG. 16 is a block diagram illustrating an example program module according to an embodiment of the present disclosure.

FIG. 16 is a block diagram illustrating an example program module according to an embodiment of the present disclosure.

Referring to FIG. 16, the program module 1610 (e.g., the program 140) may include an OS controlling resources related to the electronic device (e.g., the electronic device 101 or electronic device 200) and/or various applications (e.g., the AP 147) driven on the OS. The OS may include, e.g., Android, iOS, Windows, Symbian, Tizen, or Bada.

Referring to FIG. 16, the program 1610 may include, e.g., a kernel 1620, middleware 1630, an API 1660, and/or an application 1670. At least a part of the program module 1610 may be preloaded on the electronic device or may be downloaded from an external electronic device (e.g., the first electronic device 102 or second electronic device 104 or server 106).

The kernel 1620 (e.g., the kernel 141) may include, e.g., a system resource manager 1621 and/or a device driver 1623. The system resource manager 1621 may perform control, allocation, or recovery of system resources. According to an embodiment of the present disclosure, the system resource manager 1621 may include a process managing unit, a memory managing unit, or a file system managing unit. The device driver 1623 may include, e.g., a display driver, a camera driver, a BT driver, a shared memory driver, a USB driver, a keypad driver, a Wi-Fi driver, an audio driver, or an inter-process communication (IPC) driver.

The middleware 1630 may provide various functions to the application 1670 through the API 1660 so that the application 1670 may efficiently use limited system resources in the electronic device or provide functions jointly required by applications 1670. According to an embodiment of the present disclosure, the middleware 1630 (e.g., middleware 153) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, or a security manager 1652.

The runtime library 1635 may include a library module used by a compiler in order to add a new function through a programming language while, e.g., the application 1670 is being executed. The runtime library 1635 may perform input/output management, memory management, or operation on arithmetic functions.

The application manager 1641 may manage the life cycle of at least one application of, e.g., the applications 1670. The window manager 1642 may manage GUI resources used on the screen. The multimedia manager 1643 may grasp formats necessary to play various media files and use a codec appropriate for a format to perform encoding or decoding on media files. The resource manager 1644 may manage resources, such as source code of at least one of the applications 1670, memory or storage space.

The power manager 1645 may operate together with, e.g., a basic input/output system (BIOS) to manage battery or power and provide power information necessary for operating the electronic device. The database manager 1646 may generate, search, or vary a database to be used in at least one of the applications 1670. The package manager 1647 may manage installation or update of an application that is distributed in the form of a package file.

The connectivity manager 1648 may manage wireless connectivity, such as, e.g., Wi-Fi or BT. The notification manager 1649 may display or notify an event, such as a coming message, appointment, or proximity notification, of the user without interfering with the user. The location manager 1650 may manage locational information on the electronic device. The graphic manager 1651 may manage graphic effects to be offered to the user and their related user interface. The security manager 1652 may provide various security functions necessary for system security or user authentication. According to an embodiment of the present disclosure, when the electronic device (e.g., the electronic device 101 or electronic device 200) has telephony capability, the middleware 1630 may further include a telephony manager for managing voice call or video call functions of the electronic device.

The middleware 1630 may include a middleware module forming a combination of various functions of the above-described components. The middleware 1630 may be provided a specified module per type of the OS in order to provide a differentiated function. Further, the middleware 1630 may dynamically omit some existing components or add new components.

The API 1660 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 1670 (e.g., the AP 147) may include one or more applications that may provide functions such as, e.g., a home 1671, a dialer 1672, an SMS/MMS 1673, an IM 1674, a browser 1675, a camera 1676, an alarm 1677, a contact 1678, a voice dial 1679, an email 1680, a calendar 1681, a media player 1682, an album 1683, or a clock 1684, a health-care (e.g., measuring the degree of workout or blood sugar)(not shown), or provision of environmental information (e.g., provision of air pressure, moisture, or temperature information)(not shown).

According to an embodiment of the present disclosure, the browser 1675 may display data accessed through each of a plurality of windows in the form of a webpage. For example, the browser 1675 may display a window manager (e.g., multi-tab) screen, and the multi-tab screen may include the thumbnail images obtained by capturing the webpages displayed last through each window.

According to an embodiment of the present disclosure, the application 1670 may include an application (hereinafter, "information exchanging application" for convenience) supporting information exchange between the electronic device (e.g., the electronic device 101 or electronic device 200) and an external electronic device (e.g., the first electronic device 102 or second electronic device 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, schedule management (or planner) application, alarm application, or environmental information application) to the external electronic device (e.g., the first electronic device 102 or second electronic device 104). Further, the notification relay application may receive notification information from, e.g., the external electronic device and may provide the received notification information to the user.

The device management application may perform at least some functions of the external electronic device (e.g., the first electronic device 102 or the second electronic device 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 1670 may include an application (e.g., a health-care application of a mobile medical device) designated according to an attribute of the external electronic device (e.g., the first electronic device 102 or second electronic device 104). According to an embodiment of the present disclosure, the application 1670 may include an application received from the external electronic device (e.g., the server 106 or first electronic device 102 or second electronic device 104). According to an embodiment of the present disclosure, the application 1670 may include a preloaded application or a third party application downloadable from a server. The names of the components of the program module 1610 according to the shown embodiment may be varied depending on the type of OS.

According to an embodiment of the present disclosure, at least a part of the program module 1610 may be implemented in software, firmware, hardware, or in a combination of two or more thereof. At least a part of the programming module 1610 may be implemented (e.g., executed) by e.g., a processor (e.g., the processor 110). At least a part of the program module 1610 may include e.g., a module, program, routine, set of instructions, process, or the like for performing one or more functions.

Figure 17:
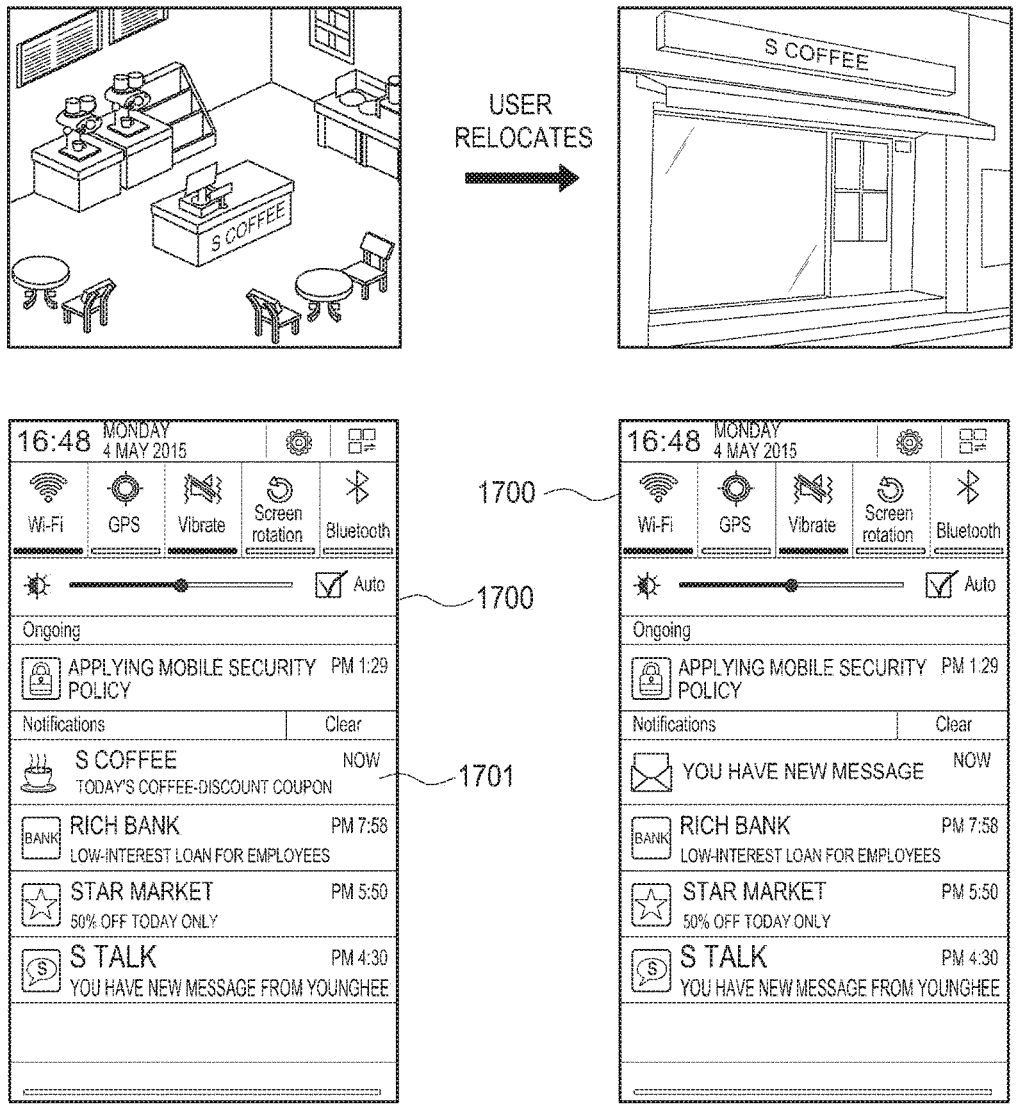
FIG. 17 is a view illustrating an example operation for determining whether to receive data according to an embodiment of the present disclosure.

FIG. 17 is a view illustrating an example operation for determining whether to receive data according to an embodiment of the present disclosure.

Referring to FIG. 17, whether to display a particular notification message 1701 may be determined depending on the position of the user on the screen 1700 where a notification message is displayed.

According to an embodiment of the present disclosure, as the user enters a user input for a notification message related to a particular place (e.g., a cafe ("S COFFEE")) to set reception reject, the electronic device may store the notification message received in relation to the cafe.

According to an embodiment of the present disclosure, the electronic device, when determining that the user is positioned in the particular place, may perform control to display the stored notification message. For example, even when reception reject is set on the particular notification message, the electronic device may perform control so that the notification message is displayed depending on the user's location.

According to an embodiment of the present disclosure, the electronic device may identify that the user's location has been changed. For example, the user may order coffee in the cafe and go out of the cafe.

According to an embodiment of the present disclosure, as the user is located in the particular place, although receiving a notification message related to the cafe, the electronic device may perform control so that the received notification message is not displayed on the screen 1700 where the notification message is displayed.

According to an embodiment of the present disclosure, the electronic device may perform control on the reception-rejected notification message based on various user activities (e.g., location of user).

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120 or controller 310), may enable the processor to carry out a corresponding function. The computer-readable storage medium may be e.g., the storage unit 340.

According to an embodiment of the present disclosure, the storage medium may store instructions executed to enable the at least one processor (e.g., the processor 120 or the controller 310) to, when the electronic device receives information from an outside thereof, identify blocking configuration information on the received information, determine a method for blocking the received information according to the blocking configuration information, and block the received information based on the determined blocking method.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or program modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

As is apparent from the foregoing description, by the electronic device and method for controlling the reception in the electronic device according to an embodiment of the present disclosure, the user may conveniently configure whether to receive various notification messages on the same screen through a user input without the need of running each application for at least one notification message on the screen to control whether to receive notification messages for the application.

By the electronic device and method for controlling the reception in the electronic device according to an embodiment of the present disclosure, the user may conveniently configure whether to receive various notification messages with a minimized number of operations for messages.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
    displaying a screen including first information which indicates a reception of at least one message;
    identifying a user input on second information indicating a reception of a specific message from among the first information;
    controlling the second information not to be displayed in the screen, if the identified user input includes a predetermined gesture;
    determining an application corresponding to the specific message;
    identifying blocking configuration information corresponding to the predetermined gesture, wherein the blocking configuration information includes, based on a gesture included in the user input, information indicating whether to receive at least one message transmitted from the application or whether to display third information indicating a reception of the at least one message transmitted from the application; and
    controlling the reception of the at least one message transmitted from the application and controlling a displaying of the third information in the screen based at least in part on the identified blocking configuration information.

2. The method of claim 1, further comprising, determining the blocking configuration information further based on a channel through which the specific message is communicated.

3. The method of claim 1, further comprising determining setting information related to the blocking configuration information further based on the user input.

4. The method of claim 1, wherein the blocking configuration information is set based on information on at least one prior activity of a user for at least one message related to the specific message.

5. The method of claim 4, wherein the information on the at least one prior activity of the user includes at least one of a history of functions performed for another message related to the at least one message related to the specific message and received from the electronic device or an external electronic device for the electronic device and a position of one of the electronic device and the external electronic device at a time when the functions are run.

6. The method of claim 4, further comprising:
    identifying a user activity related to the specific message; and
    when the user activity corresponds to a predetermined condition, releasing a blocking of the reception of the at least one message transmitted from the application after a predetermined time.

7. The method of claim 1, wherein the blocking configuration information is set based on at least a portion of information on the application.

8. An electronic device comprising:
    a display;
    a memory storing information; and
    a processor configured to:
        control the display to display a screen including first information which indicates a reception of at least one message,
        identify a user input on second information indicating a reception of a specific message from among the first information,
        control the second information not to be displayed in the screen, if the identified user input includes a predetermined gesture,
        determine an application corresponding to the specific message,
        identify blocking configuration information corresponding to the predetermined gesture, wherein the blocking configuration information includes, based on a gesture included in the user input, information indicating whether to receive at least one message transmitted from the application or whether to display third information indicating a reception of the at least one message transmitted from the application, and
        control the reception of the at least one message transmitted from the application and control a displaying of the third information in the screen based at least in part on the identified blocking configuration information.

9. The electronic device of claim 8, wherein the processor is further configured to determine the blocking configuration information further based on a channel through which the specific message is communicated.

10. The electronic device of claim 8, wherein the processor is further configured to control information indicating the reception of the at least one message to be not displayed for at least a predetermined time.

11. The electronic device of claim 8, wherein the processor is further configured to determine setting information related to the blocking configuration information further based on the user input.

12. The electronic device of claim 8, wherein the processor is further configured to identify the blocking configuration information based on information on at least one prior activity of a user for at least one message related to the specific message.

13. The electronic device of claim 12, wherein the processor is further configured to:
    identify a user activity related to the specific message, and
    when user activity information corresponds to a predetermined condition, release a blocking of the reception of the at least one message transmitted from the application after a predetermined time.

14. The electronic device of claim 12, wherein the processor is configured to control a displaying or transmitting of the received message to another electronic device, based on the information on the at least one prior activity.

15. The electronic device of claim 12, wherein the processor is further configured to display information corresponding to a portion of at least one blocked message, based on the information on the at least one prior activity.

16. The electronic device of claim 8, wherein the processor is further configured to:

control the memory to store information on at least one user activity related to the specific message, and determine the blocking configuration information further based on the activity information.

17. A non-transitory computer-readable recording medium storing instructions which, when executed, enable a processor of an electronic device to:

display a screen including first information which indicates a reception of at least one message, identify a user input on second information indicating a reception of a specific message from among the first information, control the second information not to be displayed in the screen, if the identified user input includes a predetermined gesture;

determine an application corresponding to the specific message;

identify blocking configuration information corresponding to the predetermined gesture, wherein the blocking configuration information includes, based on a gesture included in the user input, information indicating whether to receive at least one message transmitted from the application or whether to display third information indicating a reception of the at least one message transmitted from the application, and control the reception of the at least one message transmitted from the application and controlling a displaying of the third information in the screen based at least in part on the blocking configuration information.

* * * * *